United States Patent
Ohta et al.

(10) Patent No.: US 10,714,066 B2
(45) Date of Patent: *Jul. 14, 2020

(54) CONTENT CONTROL DEVICE AND STORAGE MEDIUM

(71) Applicant: YAMAHA CORPORATION, Hamamatsu-shi (JP)

(72) Inventors: Shinichi Ohta, Hamamatsu (JP); Taku Ohno, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 53 days.

This patent is subject to a terminal disclaimer.

(21) Appl. No.: 16/181,910

(22) Filed: Nov. 6, 2018

(65) Prior Publication Data

US 2019/0073988 A1    Mar. 7, 2019

Related U.S. Application Data

(63) Continuation of application No. 15/487,602, filed on Apr. 14, 2017, now Pat. No. 10,186,245, which is a
(Continued)

(30) Foreign Application Priority Data

Oct. 17, 2014 (JP) .................. 2014-212721
Oct. 17, 2014 (JP) .................. 2014-212723
Oct. 17, 2014 (JP) .................. 2014-212726

(51) Int. Cl.
*G10H 1/043* (2006.01)
*G10H 1/053* (2006.01)
(Continued)

(52) U.S. Cl.
CPC ............. *G10H 1/043* (2013.01); *G06F 3/011* (2013.01); *G06F 3/0362* (2013.01);
(Continued)

(58) Field of Classification Search
CPC .......... G10H 1/043; G10H 7/006; G10H 1/40; G10H 1/02; G10H 1/0091; G10H 1/053;
(Continued)

(56) References Cited

U.S. PATENT DOCUMENTS 8,487,176 B1 * 7/2013 Wieder ............... G10H 1/0025
84/615
2002/0078820 A1   6/2002 Miyake
(Continued)

FOREIGN PATENT DOCUMENTS

JP    S6230071 Y2    8/1987
JP    H04139499 A    5/1992
(Continued)

OTHER PUBLICATIONS

Office Action issued in Japanese Appln. No. 2015-180608 dated Jun. 4, 2019. English machine translation provided.
(Continued)

*Primary Examiner* — Jeffrey Donels
(74) *Attorney, Agent, or Firm* — Rossi, Kimms & McDowell LLP

(57) ABSTRACT

A content control device includes: a plurality of controls to which a plurality of parameters for controlling properties of a content containing at least one of sound and video are respectively assigned, each of the plurality of controls outputting a first indicated value in accordance with an operation amount of the control; and a processor configured to previously create setting information used to determine respective values of the plurality of parameters in accordance with the second indicated value; determine the values of the plurality of parameters corresponding to the second indicated value respectively in accordance with the second indicated value and the setting information; and revise each of the values of the parameters to be determined in accor-
(Continued)

dance with the first indicated value outputted for the control assigned to the parameter.

20 Claims, 12 Drawing Sheets

Related U.S. Application Data continuation of application No. PCT/JP2015/079225, filed on Oct. 15, 2015.

(51) Int. Cl.

| | | |
|---|---|---|
| G11B 27/00 | (2006.01) | |
| G10H 1/00 | (2006.01) | |
| G10H 1/02 | (2006.01) | |
| G10H 1/40 | (2006.01) | |
| G10H 7/00 | (2006.01) | |
| G06F 3/0362 | (2013.01) | |
| H04H 60/04 | (2008.01) | |
| H04N 5/262 | (2006.01) | |
| G06F 3/01 | (2006.01) | |
| G10H 1/18 | (2006.01) | |
| H04N 1/00 | (2006.01) | |

(52) U.S. Cl.
CPC ............ *G10H 1/0091* (2013.01); *G10H 1/02* (2013.01); *G10H 1/053* (2013.01); *G10H 1/40* (2013.01); *G10H 7/006* (2013.01); *G11B 27/005* (2013.01); *H04H 60/04* (2013.01); *H04N 5/262* (2013.01); *G10H 1/18* (2013.01); *G10H 2210/051* (2013.01); *G10H 2210/076* (2013.01); *G10H 2210/155* (2013.01); *G10H 2210/171* (2013.01); *G10H 2210/195* (2013.01); *G10H 2210/265* (2013.01); *G10H 2210/295* (2013.01); *G10H 2210/315* (2013.01); *G10H 2210/325* (2013.01); *G10H 2210/375* (2013.01); *G10H 2210/385* (2013.01); *G10H 2220/091* (2013.01); *G10H 2220/111* (2013.01); *G10H 2220/116* (2013.01); *G10H 2250/025* (2013.01); *G10H 2250/041* (2013.01); *G10H 2250/055* (2013.01); *G10H 2250/455* (2013.01); *G10H 2250/481* (2013.01); *H04N 1/00397* (2013.01)

(58) Field of Classification Search
CPC ....... G10H 2210/171; G10H 2210/155; G10H 2250/055; G10H 2250/041; G10H 2220/116; G10H 2220/111; G10H 2220/091; G10H 2210/265; G10H 2210/195; G10H 2250/025; G10H 2210/385; G10H 2210/315; G10H 2210/375; G10H 2210/076; G10H 2210/051; G10H 2210/325; G10H 2250/481; G10H 2250/455; G10H 2210/295; G10H 1/18; G06F 3/011; G06F 3/0362; H04N 5/262; H04N 1/00397; H04H 60/04; G11B 27/005
USPC .......................................................... 84/615
See application file for complete search history.

(56) References Cited

U.S. PATENT DOCUMENTS

| | | | |
|---|---|---|---|
| 2003/0167908 A1 | 9/2003 | Nishitani et al. | |
| 2006/0282562 A1* | 12/2006 | Aiso ...................... | H04H 60/04 710/33 |
| 2007/0061729 A1* | 3/2007 | Terada .................... | H04H 60/04 715/727 |
| 2007/0195975 A1* | 8/2007 | Cotton ................... | H04H 60/04 381/104 |
| 2010/0050106 A1* | 2/2010 | Koizumi ............. | G06F 3/04847 715/771 |
| 2011/0069025 A1* | 3/2011 | Fujita .................. | G06F 3/04847 345/173 |
| 2011/0145743 A1 | 6/2011 | Brinkmann et al. | |
| 2014/0193004 A1* | 7/2014 | Shirai .................... | H04H 60/04 381/123 |
| 2014/0254834 A1* | 9/2014 | Umeo ...................... | H04R 5/04 381/119 |
| 2014/0270181 A1* | 9/2014 | Siciliano .............. | G11B 27/038 381/17 |
| 2014/0286506 A1* | 9/2014 | Kamiya ................. | H04H 60/04 381/119 |
| 2015/0154979 A1 | 6/2015 | Uemura et al. | |

FOREIGN PATENT DOCUMENTS

| | | |
|---|---|---|
| JP | H05188937 A | 7/1993 |
| JP | H05224685 A | 9/1993 |
| JP | H07114378 A | 5/1995 |
| JP | H08185171 A | 7/1996 |
| JP | H08305361 A | 11/1996 |
| JP | H0997071 A | 4/1997 |
| JP | H10116079 A | 5/1998 |
| JP | H10124053 A | 5/1998 |
| JP | H11175063 A | 7/1999 |
| JP | H11184469 A | 7/1999 |
| JP | 2001350474 A | 12/2001 |
| JP | 2002189473 A | 7/2002 |
| JP | 2002196761 A | 7/2002 |
| JP | 2002229565 A | 8/2002 |
| JP | 2003345352 A | 12/2003 |
| JP | 2004012842 A | 1/2004 |
| JP | 2005164857 A | 6/2005 |
| JP | 2007279594 A | 10/2007 |
| JP | 2009031565 A | 2/2009 |
| JP | 2010237237 A | 10/2010 |
| JP | 2010256463 A | 11/2010 |
| WO | 2014003072 A1 | 1/2014 |

OTHER PUBLICATIONS

International Search Report issued in Intl. Appln. No. PCT/JP2015/079225 dated Dec. 22, 2015. English translation provided.

Written Opinion issued in Intl. Appln. No. PCT/JP2015/079225 dated Dec. 22, 2015.

International Preliminary Report of Patentability issued in Intl. Appln. No. PCT/JP2015/079225 dated Oct. 7, 2016. English translation provided.

Extended European Search Report issued in European Appln. 15851286.3 dated Apr. 3, 2018.

Montage 6-8 Music Synthesizer Owner's Manual (in English), published May 2016 by Yamaha Corporation.

Office Action issued in U.S. Appl. No. 15/487,602 dated Oct. 6, 2017.

Office Action issued in U.S. Appl. No. 15/487,602 dated Jun. 4, 2018.

Notice of Allowance issued in U.S. Appl. No. 15/487,602 dated Oct. 18, 2018.

Office Action issued in Japanese Appln. No. 2015-180610 dated Jul. 2, 2019. English machine translation provided.

Office Action issued in Japanese Appln. No. 2015-180609 dated Jul. 2, 2019. English machine translation provided.

Office Action issued in Chinese Appln. No. 201580056308.0 dated Mar. 11, 2020. English machine translation provided.

\* cited by examiner

TB_RE

| S | V_S1 | V_S2 |
|---|------|------|
| 1 | 10 | 10 |
| 2 | 13 | 127 |
| 3 | 8 | 0 |
| 4 | 30 | 100 |
| 5 | 35 | 110 |
| 6 | 108 | 0 |
| 7 | 0 | 127 |
| 8 | 90 | 35 |

TB_PR

| S | PARAMETER | CHANGE CHARACTERISTICS | | |
|---|-----------|------|------|------|
| | | P_S1 | P_S2 | tp |
| 1 | CUT-OFF | 10 | 100 | 1 |
| 2 | RESONANCE | 0 | 127 | 5 |
| 3 | PAN | 15 | 80 | 3 |
| ⋮ | ⋮ | ⋮ | ⋮ | ⋮ |
| 8 | DISTORTION LEVEL | 0 | 60 | 4 |

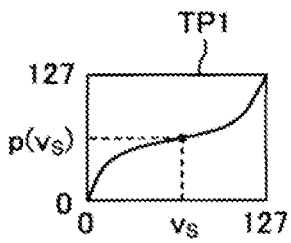
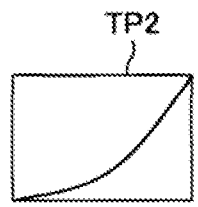
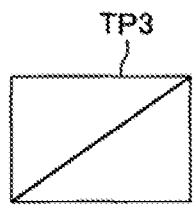
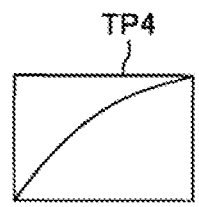
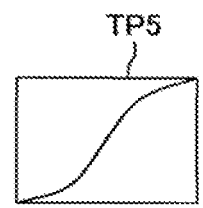
Fig.7A  Fig.7B  Fig.7C  Fig.7D  Fig.7E
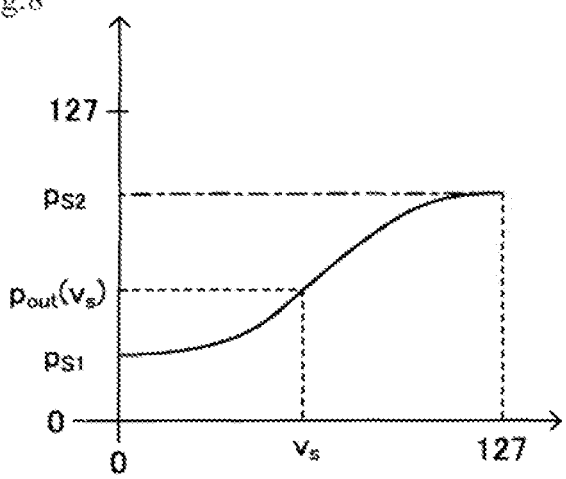
Fig.8
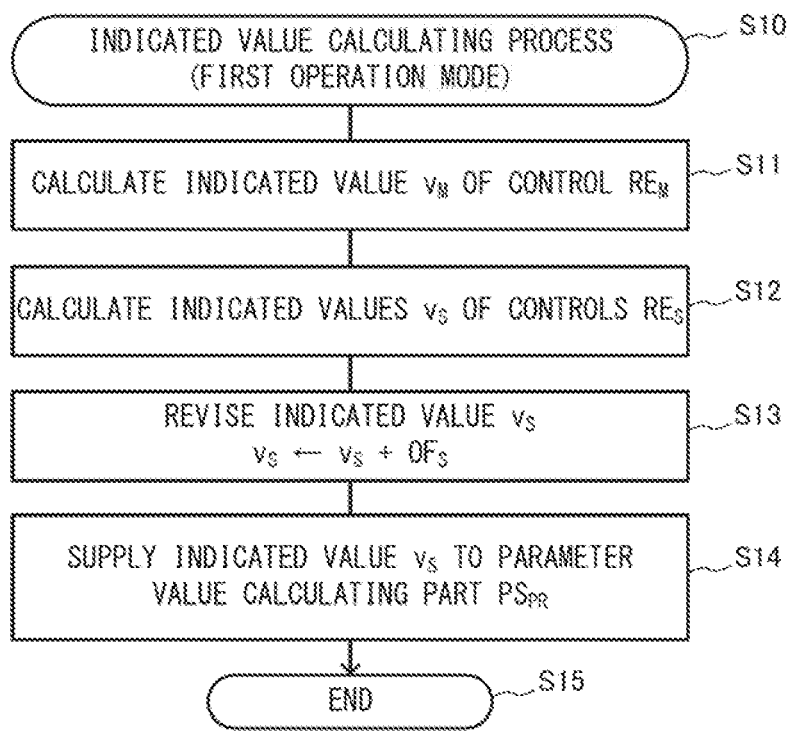
Fig.9

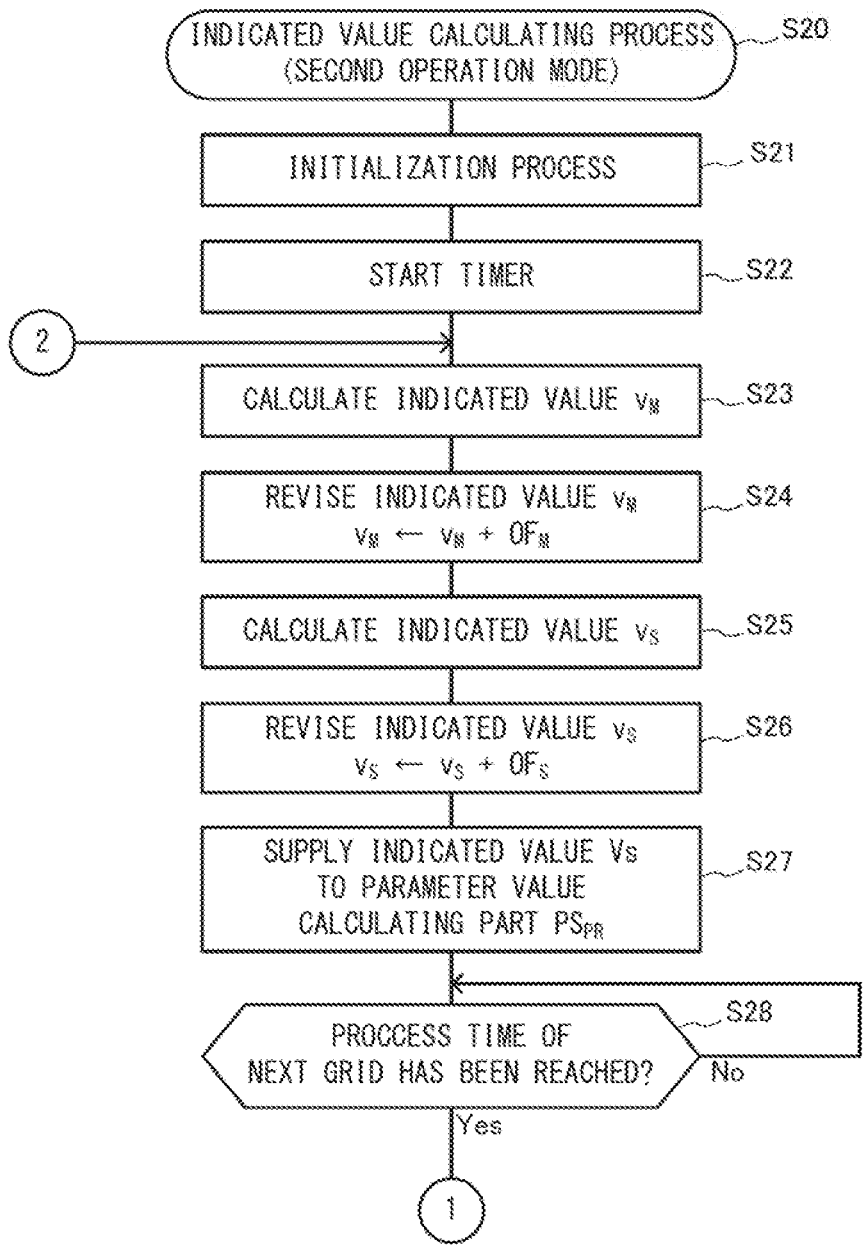

CONTENT CONTROL DEVICE AND STORAGE MEDIUM

TECHNICAL FIELD

The invention relates to a content control device and a storage medium containing program instructions of a content control program, capable of complicatedly changing properties of a content in accordance with a situation. Note that a "content" in this description means one containing at least either of sound or video, and one providable via a computer (what is called a digital content).

BACKGROUND ART

Conventionally, for example, there is known a musical sound control device capable of periodically changing timbre of musical sound being generated, as described in the following PTL1. In this musical sound control device, the timbre of the musical sound is periodically changed by changing a cut-off frequency of a filter by using a low frequency signal. This musical sound control device includes a control, and a parameter defining a frequency of the low frequency signal is assigned to the control. That is, a value of the parameter is corresponded to an indicated value of the control. When the indicated value of the control is changed by a user operating the control, the frequency of the low frequency signal is changed in accordance with the indicated value.

SUMMARY OF THE INVENTION

In the musical sound control device of PTL1 (JP S62-30071 Y2 (Examined utility model registration)), a change of the timbre is relatively monotonous because the timbre of the musical sound changes only periodically. On the other hand, in a digital audio workstation (DAW) made up of a personal computer and software, it is possible for a user to create a time-series data (sequence data) representing variation of values of various parameters such as, for example, a cut-off frequency of a filter, a resonance level of the filter, and localization of sound. The digital audio workstation reproduces the time-series data, to thereby change the timbre, the localization, and so on in accordance with the time-series data. When the time-series data is created, the user draws a graph representing variation of values of various parameters on a screen by using, for example, an input device (a mouse, a keyboard, and so on). The digital audio workstation creates the time-series data based on a shape (waveform) of the graph, and varies the values of the various parameters in accordance with the time-series data. According to the digital audio workstation, it is possible not only to periodically change the timbre, the localization, and so on, but also to change them more complicatedly. However, the digital audio workstation is suitable for use to create music in non-real time, but not so suitable for use to perform in accordance with a situation (ad-lib) while complicatedly changing the timbre, the localization, and so on. That is, it is not suitable for use by a performer or a DJ performing in accordance with, for example, look of audience, a performance mode (ad-lib performance) of other musical instruments, and so on while complicatedly changing the timbre, the localization, and so on in real time.

Besides, even when the musical sound control device or the digital audio workstation includes a plurality of controls and a plurality of parameters respectively assigned to the plurality of controls, the number of controls which can be simultaneously operated by the user is small (it is a few pieces at most). In particular, it is difficult for the user to accurately operate the plurality of controls at high-speed. It is therefore difficult for the user to complicatedly change generation modes of musical sounds by operating the plurality of controls in accordance with a situation.

Further, there is conventionally known a video control device capable of creating and displaying (projecting) video in accordance with values of a plurality of parameters in real time. It is necessary to simultaneously and complicatedly change values of the plurality of parameters to complicatedly change the video. However, it is difficult for the user to accurately operate the plurality of controls at high speed even when the plurality of parameters are respectively assigned to the plurality of controls, as same as the conventional musical sound control device or the digital audio workstation. It is therefore difficult for the user to complicatedly change the video by operating the plurality of controls in accordance with a situation.

As stated above, it is difficult to complicatedly change the properties of the content in accordance with a situation (ad-lib) in the conventional devices.

The invention is made to deal with the above-stated problem, and an object thereof is to provide a content control device capable of complicatedly changing properties of a content in accordance with a situation. Note that in the following description of each component of the invention, a reference symbol of a corresponding part of an embodiment is described in a parenthesis for ease of understanding of the invention, but each component of the invention is not limited to a configuration of the corresponding part indicated by the reference symbol of the embodiment.

To attain the above-stated object, a characteristic of the invention is that a content control device (10) includes: a plurality of controls ($RE_S$) to which a plurality of parameters for controlling properties of a content containing at least one of sound and video are respectively assigned, each of the plurality of controls outputting a first indicated value in accordance with an operation amount of the control; and a processor configured to: obtain a time-varying second indicated value; previously create setting information ($TB_{RE}$, $TB_{PR}$) used to determine respective values of the plurality of parameters in accordance with the second indicated value; determine the values of the plurality of parameters corresponding to the second indicated value ($v_M$) respectively in accordance with the second indicated value and the setting information, and revise each of the values of the parameters to be determined in accordance with the first indicated value outputted for the control ($RE_S$) assigned to the parameter; and control the properties of the content in accordance with the determined or revised values of the plurality of parameters. Note that a tone generator circuit 17 in the embodiment corresponds to a processor which performs the above controlling of the properties of the content. Besides, the indicated value (the first indicated value) of the control may be a value itself outputted from the control or a value calculated by using a signal outputted from the control. Besides, the indicated value (the second indicated value) may be obtained as a value itself, or a value calculated by using a signal outputted from some device. For example, when a potentiometer is adopted as a control to obtain the indicated value, the indicated value is a voltage value as an output of the potentiometer. Besides, for example, when an encoder is adopted as a control to obtain the indicated value, the signal is a pulse as an output of the encoder, and the indicated value is a value obtained by counting the number of the pulses.

In this case, the processor is preferably configured to be capable of setting an increase and decrease amount of the value of each parameter to be previously created, relative to an increase and decrease amount of the second indicated value.

Besides, in this case, the processor may be configured to be capable of setting a mode of change of each parameter value to be previously created, relative to a mode of change of the second indicated value.

Further, in this case, the processor is preferably further configured to store a plurality of characteristic data (templates TP1 to TP5) used to define the mode of the change of each parameter value relative to the mode of the change of the second indicated value, and is preferably configured to set the mode of the change of each parameter value relative to the mode of the change of the second indicated value by using a characteristic data selected from the plurality of characteristic data.

According to the content control device constituted as stated above, values of the plurality of parameters can be changed only by changing the indicated value (the second indicated value), and therefore, it is possible for the user to complicatedly change the content in accordance with a situation. In addition, the user can arbitrary set a correspondence (setting information) between each second indicated value and each value of the parameters. That is, the user can arbitrary set the change of the content relative to the change of the second indicated value. It is thereby possible to change the content just as the user intends.

Besides, when the user operates the control, the parameter value is revised in accordance with the operation amount. That is, it is possible for the user not only to simultaneously change the plurality of parameter values by changing the second indicated value, but also to change only the parameter value assigned to one control by operating the one of the plurality of controls.

Besides, another characteristic of the invention is that the content control device (10) includes a processor configured to sequentially obtain information regarding sound or video from outside, and detect a tempo based on the obtained information; store a pattern data (PD) representing a variation pattern of an indicated value ($GD_y$) and comprised of the indicated value at each time point, and sequentially obtain the indicated value in accordance with the pattern data; previously create setting information ($TB_{RE}$, $TB_{PR}$) used to determine a plurality of parameter values defining properties of a content containing at least one of the sound and the video based on the obtained indicated value; sequentially obtain each indicated value constituting the pattern data at the detected tempo, and determine the plurality of parameter values corresponding to the obtained indicated values in accordance with the setting information; and control the properties of the content in accordance with the determined plurality of parameter values. Note that, for example, the tone generator circuit 17 in the embodiment corresponds to a processor which performs the above controlling of the properties of the content.

According to the content control device constituted as stated above, it is possible to automatically change the plurality of parameter values even if the user does not operate the control. That is, the control device according to the present invention detects the tempo based on the obtained information regarding the sound or the video in the content. For example, detected are a tempo of a performance of other musical instruments or the like, a reproduction tempo of video, and so on. The pattern data is reproduced in synchronization with the tempo. The properties of the content thereby change in synchronization with the tempo. The change of the properties of the content in accordance with the tempo realizes fascinating representation which is different from a case of just randomly changing the properties of the content. In the content control device according to the present invention, there is no need for the user to operate the control in accordance with the tempo, and therefore, the user can concentrate on other operations (for example, a keyboard performance). As stated above, according to the content control device of the invention, it is possible to complicatedly change the properties of the content in accordance with the situation (tempo).

Besides, another characteristic of the invention is that a first control ($RE_M$) which is operated by a user and configured to output an indicated value specified by the user is included, and the processor is preferably configured to revise the obtained indicated value in accordance with an indicated value ($v_M$) of the first control. Note that the indicated value of the first control may be a value itself which is outputted from the first control, or may be a value calculated by using a signal outputted from the first control. For example, when the first control is a potentiometer, the indicated value is a voltage value as an output of the potentiometer. Besides, for example, when the first control is an encoder, the signal is a pulse as an output of the encoder, and the indicated value is a value obtained by counting the number of the pulses.

According to the above configuration, when the user operates the first control during reproduction of the pattern data, the indicated value of the first control which has been determined based on the pattern data is thereby revised in accordance with an operation amount of the operation. That is, it is possible to further change the properties of the content which have been determined based on the pattern data by the user operating the first control.

Besides, another characteristic of the invention is that a plurality of second controls ($RE_S$) which are operated by the user and each output an indicated value specified by the user are included, and the processor is configured to calculate a plurality of indicated values ($v_S$) each corresponding to the obtained indicated value in accordance with the setting information; calculate a plurality of parameter values corresponding to the plurality of calculated indicated values in accordance with the setting information; and revise the calculated indicated values in accordance with the indicated value of the second control. Note that the indicated value of the second control may be a value itself which is outputted from the second control, or may be a value calculated by using a signal outputted from the second control.

According to the above configuration, when the user operates the second control during reproduction of the pattern data, the indicated value of the second control which has been determined based on the pattern data and the setting information is revised in accordance with an operation amount of the operation. That is, it is possible to further change the properties of the content which have been determined based on the pattern data by the user operating any one or a plurality of controls among the plurality of second controls.

Besides, another characteristic of the present invention is that a tempo magnification determining control (RS) configured to output an indicated value indicating a magnification of the tempo is included, and the processor is further configured to revise the detected tempo in accordance with the indicated value of the tempo magnification determining control.

It is thereby possible for the user to change a reproduction tempo of the pattern data by operating the tempo magnification determining control during reproduction of the pattern data.

Besides, another characteristic of the present invention is that the processor is further configured to transform the variation pattern by adjusting the indicated value in the pattern data.

It is thereby possible for the user to change the properties of the content by transforming the variation pattern in real time.

Another characteristic of the present invention is that the content control device (10) includes a processor configured to obtain an audio waveform signal representing an audio waveform, detect an envelope of the obtained audio waveform signal, and sequentially obtain an indicated value (AM) in accordance with the envelope; previously create setting information ($TB_{PR}$, $TB_{RE}$) used to determine a plurality of parameter values defining the properties of a content containing at least one of sound and video based on the obtained indicated value; determine the plurality of parameter values corresponding to the obtained indicated value in accordance with the setting information; and control the properties of the content in accordance with the determined plurality of parameter values. Note that, for example, the tone generator circuit 17 in the following embodiment corresponds to a processor which performs the above controlling of the properties of the content.

According to the content control device constituted as stated above, it is possible to automatically change the plurality of parameter values even if the user does not operate the control. That is, the properties of the content change in synchronization with the obtained envelope of the audio waveform. When the properties of the content are changed in accordance with the envelope of the audio waveform, a sense of unity between sound represented by the audio waveform and the content increases, and fascinating representation which is different from a case of just randomly changing the properties of the content. According to the content control device of the invention, there is no need for the user to operate the control to the obtained envelope of the audio waveform, and therefore, the user can concentrate on other operations (for example, the keyboard performance). As stated above, according to the content control device of the invention, it is possible to complicatedly change the properties of the content in accordance with the situation (the obtained envelope of the audio waveform).

Besides, another characteristic of the invention is that a first control ($RE_M$) which is operated by the user and outputs an indicated value ($v_M$) specified by the user is included, and the processor is further configured to revise the obtained indicated value in accordance with the indicated value of the first control. Note that the indicated value of the first control may be a value itself outputted from the first control or a value calculated by using a signal outputted from the first control. For example, when the first control is a potentiometer, the indicated value is a voltage value as an output of the potentiometer. Besides, for example, when the first control is an encoder, the signal is a pulse as an output of the encoder, and the indicated value is a value obtained by counting the number of the pulses.

According to the above configuration, when the user operates the first control, the indicated value determined based on the envelope is revised in accordance with an operation amount of the operation. That is, it is possible to further change the properties of the content which have been determined based on the envelope by the user operating the first control.

Besides, another characteristic of the invention is that a plurality of second controls ($RE_S$) which are operated by the user and output indicated values specified by the user are included, and the processor is further configured to calculate a plurality of indicated values ($v_S$) each corresponding to the obtained indicated value in accordance with the setting information; and calculate a plurality of parameter values corresponding to the plurality of calculated indicated values in accordance with the setting information, and revise the calculated indicated value in accordance with the indicated value of the second control. Note that the indicated value of the second control may be a value itself outputted from the second control or a value calculated by using a signal outputted from the second control.

When the user operates the second control, the indicated value determined based on the envelope and the setting information is thereby revised in accordance with an operation amount of the operation. That is, it is possible for the user to further change the properties of the content determined based on the envelope by operating any one or a plurality of controls among the second controls.

Further, another characteristic of the invention is that the content control device includes a display ($LRE_S$, $LRE_M$) whose display modes change in accordance with the second indicated value. Thereby the user can visually recognize a present value of the indicated value (or the parameter).

Besides, another characteristic of the invention is that the content comprises musical sounds of a plurality of performance parts, and the processor is configured to control the properties of musical sounds of selected one or more of the performance parts in accordance with the determined or revised values of the plurality of parameters.

Incidentally, the invention can be embodied as a computer program (a content control program) to be applied to a computer included in the content control device without being limited to an embodiment as the content control device.

BRIEF DESCRIPTION OF THE DRAWINGS

FIG. 7A to FIG. 7E illustrate graphic charts each representing an outline of a template.

FIG. 8 is a conceptual diagram illustrating a relationship between an indicated value ($v_S$) of the control and a parameter value ($p_{out}(v_S)$).

FIG. 9 is a flowchart illustrating an indicated value calculating program.

FIG. 13A is a flowchart illustrating a first-half part of the indicated value calculating program.

DESCRIPTION OF EMBODIMENTS

There is described an electronic musical instrument 10 where a content control device according to one embodiment of the invention is applied. First, an outline of the electronic musical instrument 10 is described. The electronic musical instrument 10 generates musical sounds in accordance with a performance operation of a user. Besides, the electronic musical instrument 10 includes an automatic performance function for generating the musical sounds in accordance with a sequence data representing performances of a plurality of performance parts. It is possible for the user to manually perform a main melody (a manual performance part) while reproducing an accompaniment (an automatic performance part) by using the automatic performance function. Besides, the electronic musical instrument 10 includes a control (later-described input controls 11) for changing generation modes (timbre and localization) of the musical sounds. In detail, the electronic musical instrument 10 has three operation modes as described later. In a first operation mode, when the user operates the control, the electronic musical instrument 10 changes the generation modes of the musical sounds of one or a plurality of performance parts selected from the manual performance part and the automatic performance part in accordance with the above-stated operation. On the other hand, in a second and a third operation mode, the generation modes of the musical sounds are automatically changed even if the user does not operate the control. In the second operation mode, the electronic musical instrument 10 automatically changes the generation modes of the musical sounds in accordance with a predetermined pattern data. Besides, in the third operation mode, the electronic musical sound 10 automatically changes the generation modes of the musical sounds in accordance with an envelope (a rough change of an amplitude) of an audio waveform.

Figure 1:
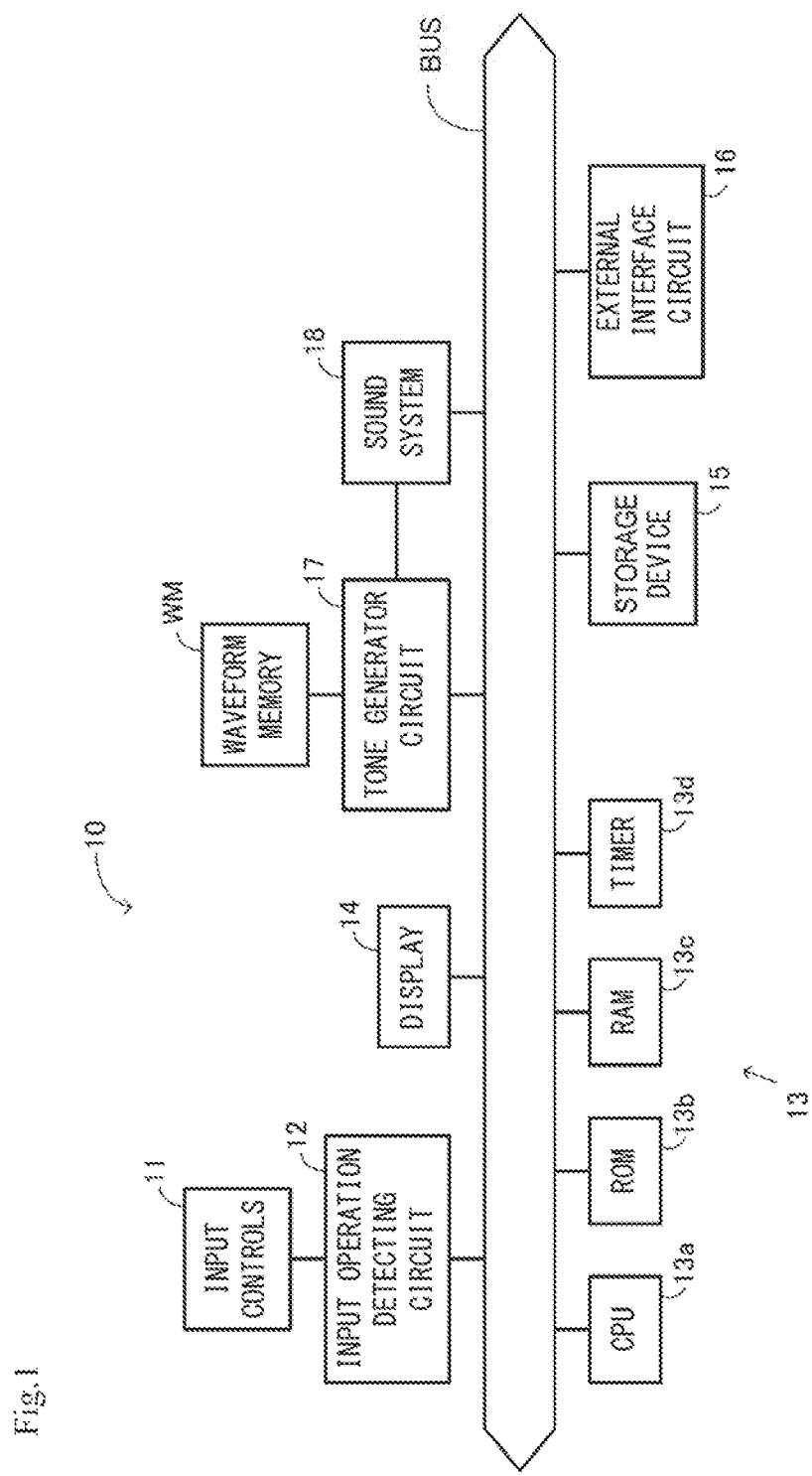
FIG. 1 is a block diagram illustrating a configuration of an electronic musical instrument according to one embodiment of the invention.

Next, a concrete configuration of the electronic musical instrument 10 is described. As illustrated in FIG. 1, the electronic musical instrument 10 includes the input controls 11, an input operation detecting circuit 12, a computer part 13, a display 14, a storage device 15, an external interface circuit 16, a tone generator circuit 17, and a sound system 18, and they are connected through a bus BUS.

The input controls 11 are used when setting various parameters, when performing a music, and so on. The input controls 11 are constituted by a switch corresponding to on/off operations, a rotary potentiometer or a rotary encoder corresponding to a rotation operation, a linear potentiometer or a liner encoder corresponding to a slide operation, a mouse, a touch panel, and so on. Further, a keyboard device which is used when performing a music is also included in the input controls 11. Besides, a pedal control (an expression pedal, a pedal switch, a damper pedal, or so on) is also included in the input controls 11. A concrete configuration of the input controls 11 is described later. When the user operates any of the input controls 11, the input operation detecting circuit 12 detects that the input control 11 is operated and an operation content of the detected operation. The input operation detecting circuit 12 supplies an interrupt signal indicating that the input control 11 is operated to the later-described computer part 13 through the bus BUS. The input operation detecting circuit 12 supplies operation information representing the operation content to the computer part 13 in accordance with a request by the computer part 13.

The computer part 13 includes a CPU 13a, a ROM 13b, a RAM 13c, and a timer 13d each connected to the bus BUS. The CPU 13a reads various programs from the ROM 13b, and executes various processes. For example, the CPU 13a controls the later-described tone generator circuit 17, and generates a musical sound corresponding to a pressed key among a plurality of keys which constitute the keyboard device. Besides, the CPU 13a controls the tone generator circuit 17 in accordance with a sequence data representing performances of a plurality of performance parts, and sequentially generates a plurality of musical sounds (the automatic performance function). Besides, the CPU 13a supplies a plurality of parameter values which define the generation modes of the musical sounds to the tone generator circuit 17.

Initial setting parameters, graphic data, character data to generate display data representing images to be displayed on the display 14, and so on are stored in the ROM 13b in addition to the various programs. Various data is temporarily stored in the RAM 13c when the various programs are executed. The timer 13d includes a counter which increments a count value at a predetermined time interval.

The display 14 is constituted by a liquid crystal display (LCD). The computer part 13 generates a display data representing a display content using the graphic data, the character data, and so on, and supplies the display data to the display 14. The display 14 displays an image based on the display data supplied from the computer part 13. For example, there are displayed name of the presently selected musical sounds, values of various parameters defining the generation modes of the musical sounds, and so on.

Besides, the storage device 15 is constituted by high-capacity nonvolatile recording media such as a HDD, a DVD, and drive units corresponding to respective recording media.

The external interface circuit 16 includes a connection terminal which enables the electronic musical instrument 10 to be connected to external equipment such as another electronic musical instrument, a personal computer or the like. The electronic musical instrument 10 can be connected to communication networks such as LAN (local area network), and the Internet through the external interface circuit 16.

There are stored a plurality of audio waveform data respectively representing audio waveforms of musical sounds of a piano, an organ, a violin, a trumpet, and so on in a waveform memory WM. The tone generator circuit 17 reads an audio waveform data specified by the CPU 13a from the waveform memory WM. The tone generator circuit 17 generates a digital audio signal by adjusting the read audio waveform data in accordance with the parameter value supplied from the CPU 13a, and supplies the audio waveform data to the sound system 18. Besides, the tone generator circuit 17 includes an effect circuit which supplies effects such as reverb and chorus to the various musical sounds in accordance with the parameter value supplied from the CPU 13a, a filter, and so on. That is, the tone generator circuit 17 is a musical sound control device which controls the generation modes of the musical sounds in accordance with parameters.

The sound system 18 includes a D/A converter which converts the digital audio signal supplied from the tone generator circuit 17 into an analog audio signal, an amplifier which amplifies the converted analog audio signal, and a left and right pair of speakers which respectively convert and output the amplified analog audio signals into sound signals. Besides, the sound system 18 includes a microphone which converts and outputs a sound signal representing performances (phrases) of other musical instruments or the like (an electronic musical instrument different from the electronic musical instrument 10, an acoustic musical instrument, a singing voice, and so on) into an analog audio signal (an audio waveform signal), and an A/D converter which converts the analog audio signal outputted from the microphone into a digital audio signal. The A/D converter calculates a sample value indicating a wave height value of the obtained analog audio signal by every predetermined sampling period (for example, 1/44100 seconds), and supplies the sample value to the computer part 13.

Figure 2:
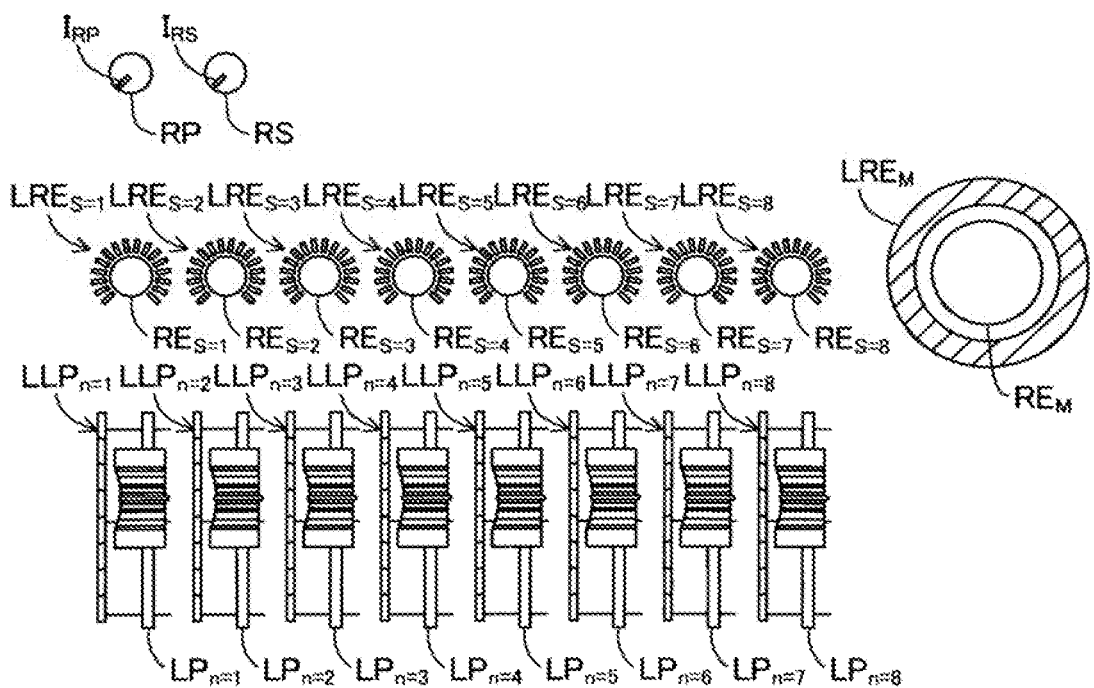
FIG. 2 is a schematic diagram illustrating a configuration of a controls.

Next, the input controls 11 are concretely described. As illustrated in FIG. 2, the electronic musical instrument 10 includes a plurality of controls $RE_{S=1, 2, \ldots, 8}$, $RE_M$, $LP_{n=1, 2, \ldots, 8}$, RP, and RS to which various parameters can be assigned.

The controls $RE_S$, $RE_M$ are rotary encoders each having a knob rotatable around a predetermined rotating shaft. That is, when the knobs of the controls $RE_S$, $RE_M$ are turned, the controls $RE_S$, $RE_M$ output two pulse trains Pa, Pb whose phases are different from each other by 90°. When a rotation direction of the knob of the control $RE_S$ is clockwise, the phase of the pulse train Pa proceeds by 90° than the phase of the pulse train Pb. On the other hand, when the rotation direction of the knob of the control $RE_S$ is counterclockwise, the phase of the pulse train Pa delays by 90° than the phase of the pulse train Pb.

A plurality (for example, 16 pieces) of light-emitting diodes $LRE_S$ are disposed around the knob of each control $RE_S$. Besides, an annular light-emitting element $LRE_M$ which surrounds the knob of the control $RE_M$ is disposed. The light-emitting element $LRE_M$ is constituted by an annularly disposed plurality of light-emitting diodes, and a cover covering the plurality of light-emitting diodes. The cover diffuses light emitted from the plurality of light-emitting diodes. A shaded part in FIG. 2 thereby uniformly emits light. Besides, the light-emitting diodes constituting the light-emitting element $LRE_M$ are constituted by red, green, and blue light-emitting diodes, and they are arranged such that light emitting amounts thereof can be respectively controlled.

An emission color as a whole of the light-emitting element $LRE_M$ can be thereby arbitrarily set.

The controls $LP_{n=1, 2, \ldots, 8}$ are linear potentiometers. The control $LP_n$ includes a slidable lever, and outputs an indicated value (a voltage value) corresponding to a position of the lever. At a left side of the control $LP_n$, a plurality (for example, eight pieces) of light-emitting diodes $LLP_n$ are arranged along a moving direction of the lever.

The control RP is a rotary potentiometer. The control RP includes a knob rotatable around a predetermined rotating shaft, and outputs an indicated value (a voltage value) in accordance with a rotation angle (a direction of an index $I_{RP}$) of the knob.

The control RS is a rotary switch. The control RS includes a knob rotatable around a predetermined rotating shaft, and outputs an indicated value (a voltage value) corresponding to a rotation angle (a direction of an index $I_{RS}$) of the knob.

(First Operation Mode)

Next, the first operation mode of the electronic musical instrument 10 is described. In the first operation mode, the controls $RE_{S=1, 2, \ldots, 8}$ and the control $RE_M$ function as the controls for changing the generation modes of the musical sounds in real time. That is, parameters each defining the generation modes of the musical sounds are respectively assigned to the controls $RE_S$. The parameters defining the generation modes of the musical sounds are not assigned to the control $RE_M$. The electronic musical instrument 10 is configured such that the values of the parameters respectively assigned to the controls $RE_S$ simultaneously changes when the user operates the control $RE_M$ by a hand. As stated above, the first operation mode is the operation mode supposing usage where the generation modes of the musical sounds are manually changed.

Figure 3:
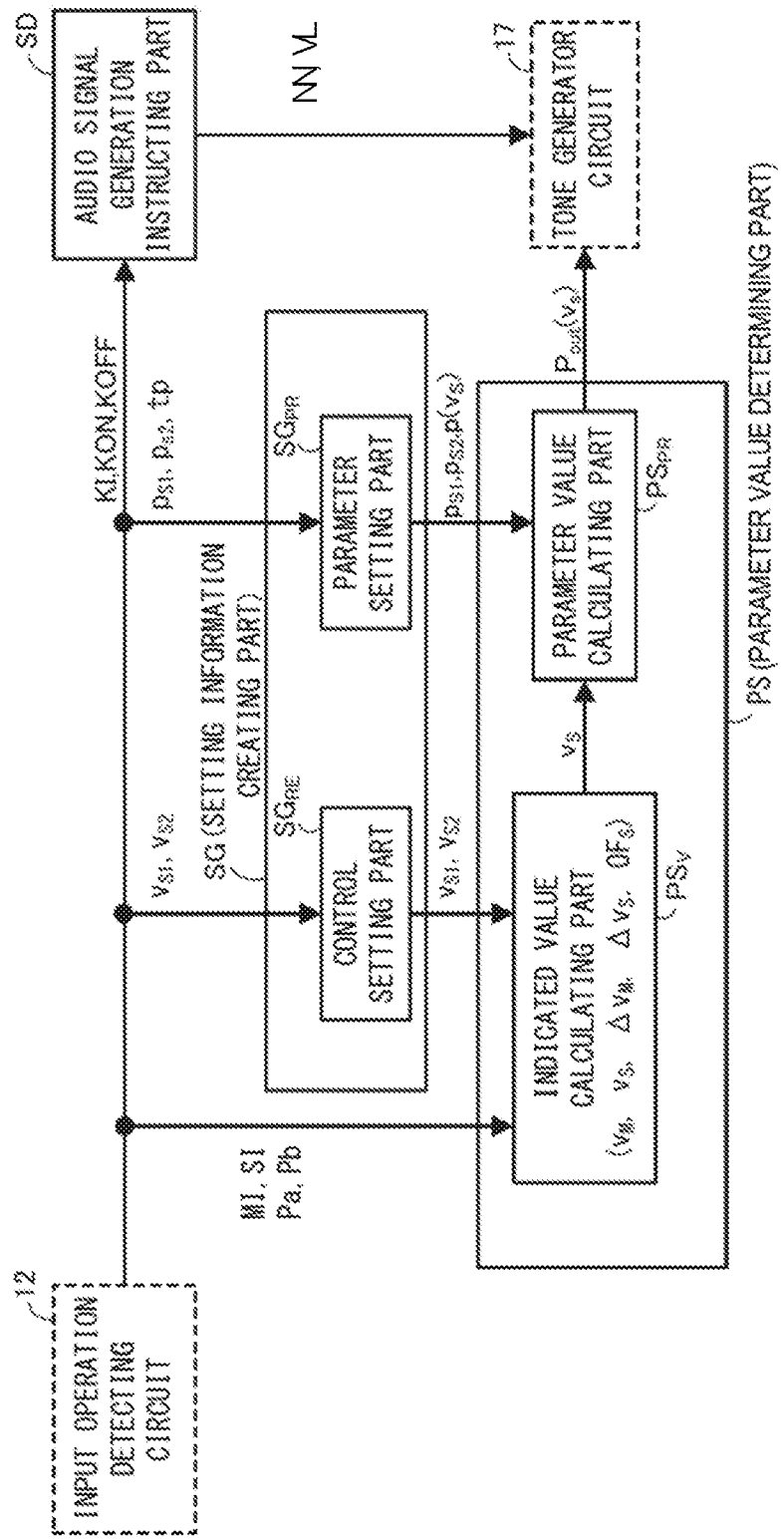
FIG. 3 is a functional block diagram of a first operation mode.

In the first operation mode, the CPU 13a executes various programs, and thereby, functions as a setting information creating part SG, an audio signal generation instructing part SD, and a parameter value determining part PS as illustrated in FIG. 3. The setting information creating part SG includes a control setting part $SG_{RE}$ and a parameter setting part $SG_{PR}$. Besides, the parameter value determining part PS includes an indicated value calculating part $PS_V$ and a parameter value calculating part $PS_{PR}$.

Figures 4, 5, 6:
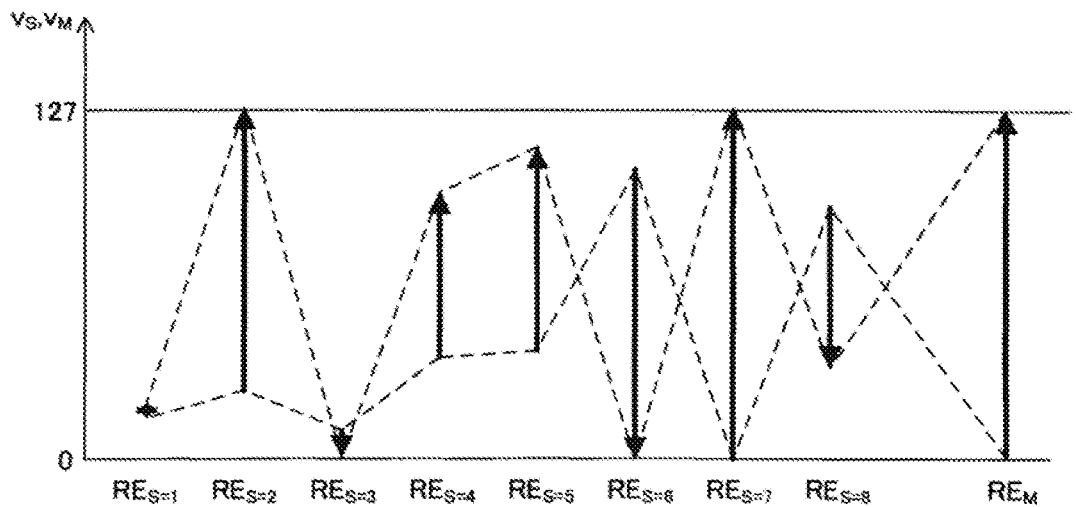
FIG. 4 is a conceptual diagram illustrating a correspondence of indicated values of the controls.
FIG. 5 illustrates a control setting table.
FIG. 6 illustrates a parameter setting table.

Next, the setting information creating part SG is described. In the first operation mode, the setting information creating part SG previously creates a control setting table $TB_{RE}$ representing a correspondence between an indicated value $v_M$ of the control $RE_M$ and indicated values $v_S$ of the controls $RE_S$ as illustrated in FIG. 4 and FIG. 5 in accordance with an instruction of the user. Specifically, the user first operates the input controls 11 (for example, the touch panel), and inputs indicated values $v_{S1}$ of the controls $RE_S$ when the indicated value of the control $RE_M$ is "0" (zero), and indicated values $v_{S2}$ of the controls $RE_S$ when the indicated value of the control $RE_M$ is "127". Input operation information representing the input operations by the user is supplied to the control setting part $SG_{RE}$ through the input operation detecting circuit 12. The control setting part $SG_{RE}$ stores the inputted respective indicated values in the RAM 13c as the control setting table $TB_{RE}$. Note that, the created control setting table $TB_{RE}$ may be stored also in the ROM 13b, the stored control setting table $TB_{RE}$ may be read when the first operation mode is restarted, and the read control setting table $TB_{RE}$ may be edited.

When the indicated value $v_{S2}$ is larger than the indicated value $v_{S1}$, the indicated value $v_S$ of the control $RE_S$ increases as the indicated value $v_M$ of the control $RE_M$ increases, and the indicated value $v_S$ of the control $RE_S$ decreases as the indicated value $v_M$ of the control $RE_M$ decreases. On the other hand, when the indicated value $v_{S2}$ is smaller than the indicated value $v_{S1}$, the indicated value $v_S$ of the control $RE_S$ decreases as the indicated value $v_M$ of the control $RE_M$ increases, and the indicated value $v_S$ of the control $RE_S$ increases as the indicated value $v_M$ of the control $RE_M$ decreases. Besides, when the indicated value $v_{S1}$ and the indicated value $v_{S2}$ are the same value, the indicated value $v_S$ of the control $RE_S$ does not change even if the indicated value $v_M$ of the control $RE_M$ increases or decreases.

Besides, the parameter setting part $SG_{PR}$ previously creates a parameter setting table $TB_{PR}$ representing parameters to be assigned to the controls $RE_S$, and a correspondence between the indicated values $v_S$ of the controls $RE_S$ and the parameter values as illustrated in FIG. 6 in accordance with an instruction of the user. To simplify the description, there is described an example where parameters defining the generation modes of the musical sounds of the manual performance part are assigned to the controls $RE_{S=1, 2, \ldots, 8}$ one by one in this embodiment. However, a plurality of parameters may be assigned to one control $RE_S$. Besides, parameters defining the generation modes of the musical sounds of one performance part or a plurality of performance parts among the automatic performance parts may be assigned to the controls $RE_{S=1, 2, \ldots, 8}$.

Specifically, the user operates the input control 11 (for example, the touch panel), and inputs parameter values $p_{S1}$ when the indicated value $v_S$ of the control $RE_S$ is at the minimum ("0" (zero)), and parameter values $p_{S2}$ when the indicated value $v_S$ of the control $RE_S$ is at the maximum ("127"). Further, the user selects one template from among templates TP1 to TP5 representing characteristics of change of the parameter value relative to change of the indicated value $v_S$ of the control $RE_S$ as illustrated in FIG. 7, and inputs a number tp of the template. Each of the templates TP1 to TP5 is a table representing a relationship between the indicated value $v_S$ and a parameter value $p(v_S)$ when the parameter value $p_{S1}$ is "0" (zero) and the parameter value $p_{S2}$ is "127". In an example illustrated in FIG. 8, the parameter value does not largely change when the indicated value $v_S$ of the control $RE_S$ changes in a range near the maximum value ("127") or the minimum value ("0" (zero)), but the parameter value largely changes when the indicated value $v_S$ of the control $RE_S$ changes in a range near the center value ("64"). Note that it is conceivable that that the user can create a table similar to the templates TP1 to TP5.

Next, the audio signal generation instructing part SD is described. When a key of the keyboard device is pressed down, or when the pressed key is released, the input operation detecting circuit 12 supplies an interrupt signal KI to the audio signal generation instructing part SD. The audio signal generation instructing part SD obtains, from the keyboard device, a key-on data KON indicating that the key of the keyboard device is pressed down, or a key-off data KOFF indicating that the key of the keyboard device is released by using the key-on key-off interrupt signal KI as a trigger. The key-on data KON contains a note number NN indicating a note of the pressed key, and a velocity VL indicating a pressed strength. Besides, the key-off data KOFF contains the note number NN indicating the note of the released key. When the key-on data KON is obtained, the audio signal generation instructing part SD supplies the note number NN and the velocity VL contained in the key-on data KON to the tone generator circuit 17, and cause the tone generator circuit 17 to generate an audio signal corresponding to the supplied data. When the key-off data KOFF is obtained, the audio signal generation instructing part SD supplies the note number NN contained in the key-off data to the tone generator circuit 17, and cause the tone generator circuit 17 to stop generation of an audio signal corresponding to the supplied data.

Next, the parameter value determining part PS is described. The indicated value calculating part $PS_V$ calculates the indicated values of the control $RE_M$ and the controls $RE_S$. When starting the first operation mode, the indicated value calculating part $PS_V$ sets the indicated value $v_M$ of the control $RE_M$ to "0" (zero) or a predetermined initial value. When the knob of the control $RE_M$ is manually operated, the input operation detecting circuit 12 supplies an interrupt signal MI indicating that the control $RE_M$ is operated to the indicated value calculating part $PS_V$. The indicated value calculating part $PS_V$ reads and executes an indicated value calculating program illustrated in FIG. 9 from the ROM 13b in response to the interrupt signal MI. The indicated value calculating part $PS_V$ starts an indicated value calculating process in step S10. Next, the indicated value calculating part $PS_V$ calculates the indicated value $v_M$ of the control $RE_M$ in step S11. Specifically, the indicated value calculating part $PS_V$ obtains the two pulse trains Pa, Pb outputted from the control $RE_M$ through the input operation detecting circuit 12. Then, the indicated value calculating part $PS_V$ calculates a manual operation amount $\Delta v_M$ of the control $RE_M$ based on the number of pulses constituting the pulse train Pa (or the pulse train Pb) and a phase difference between the pulse trains Pa, Pb. When the rotation direction of the knob of the control $RE_M$ is clockwise, the manual operation amount $\Delta v_M$ is a positive value. On the other hand, when the rotation direction of the knob of the control $RE_M$ is counterclockwise, the manual operation amount $\Delta v_M$ is a negative value. The indicated value calculating part $PS_V$ adds the calculated manual operation amount $\Delta v_M$ to the indicated value $v_M$.

Accordingly, when the user turns the knob of the control $RE_M$ clockwise, the indicated value $v_M$ of the control $RE_M$ increases in proportion to a rotation angle thereof. On the other hand, when the user turns the knob of the control $RE_M$ counterclockwise, the indicated value $v_M$ of the control $RE_M$ decreases in proportion to the rotation angle thereof. The maximum value of the indicated value $v_M$ of the control $RE_M$ is, for example, "127". Besides, the minimum value of the indicated value $v_M$ of the control $RE_M$ is, for example, "0" (zero). That is, the indicated value $v_M$ of the control $RE_M$ does not change even if the knob of the control $RE_M$ is further turned clockwise when the indicated value $v_M$ of the control $RE_M$ is "127". Besides, the indicated value $v_M$ of the control $RE_M$ does not change even if the knob of the control $RE_M$ is further turned counterclockwise when the indicated value $v_M$ of the control $RE_M$ is "0" (zero). The indicated value calculating part $PS_V$ sets an emission color (display mode) of the light-emitting element $LRE_M$ to a color corresponded to the indicated value $v_M$ of the control $RE_M$. Though the electronic musical instrument 10 can display the present indicated value $v_M$ of the control $RE_M$ on the display 14, the user can recognize the rough indicated value $v_M$ of the control $RE_M$ also by the emission color of the light-emitting element $LRE_M$.

Next, the indicated value calculating part $PS_V$ calculates the indicated values $v_S$ of the controls $RE_S$ respectively in step S12. Specifically, the indicated value calculating part $PS_V$ obtains the indicated values $v_{S1}$, $v_{S2}$ with reference to the control setting table $TB_{RE}$, and applies the current indicated value $v_M$ of the control $RE_M$ and the obtained indicated values $v_{S1}$, $v_{S2}$ to the following mathematical expression (1). The current indicated value $v_S$ of the control $RE_S$ is thereby calculated by linear interpolation.

Math. 1

$$v_S \leftarrow \frac{v_{S2} - v_{S1}}{127} \times v_M + v_{S1} \qquad (1)$$

Note that in the first operation mode, when the control $RE_S$ is manually operated, the indicated value $v_S$ is revised in accordance with a manual operation amount $\Delta v_S$ of the operation. Specifically, the indicated value calculating part $PS_V$ calculates a control offset $OF_S$ which is described later, and revises the indicated value $v_S$ by adding the control offset $OF_S$ to the calculated indicated value $v_S$. When starting the first operation mode, the control offset $OF_S$ is set at "0" (zero). When the control $RE_S$ is manually operated during the first operation mode, the indicated value calculating part $PS_V$ executes an interrupt process as described below to update the control offset $OF_S$.

When the knob of the control $RE_S$ is manually operated in the first operation mode, the input operation detecting circuit 12 supplies an interrupt signal SI indicating that the control $RE_S$ is operated to the indicated value calculating part $PS_V$. The indicated value calculating part $PS_V$ obtains the two pulse trains Pa, Pb outputted from the control $RE_S$ through the input operation detecting circuit 12 in response to the interrupt signal SI. Then, the indicated value calculating part $PS_V$ calculates the manual operation amount $\Delta v_S$ of the control $RE_S$ based on the number of pulses constituting the pulse train Pa (or the pulse train Pb) and the phase difference between the pulse trains Pa, Pb. When a rotation direction of the control $RE_S$ is clockwise, the manual operation amount $\Delta v_S$ is a positive value. On the other hand, when the rotation direction of the control $RE_S$ is counterclockwise, the manual operation amount $\Delta v_S$ is a negative value. The indicated value calculating part $PS_V$ adds the manual operation amount $\Delta v_S$ to the control offset $OF_S$. The indicated value calculating part $PS_V$ revises the indicated value $v_S$ by adding the control offset $OF_S$ to the indicated value $v_S$ in step S13. Note that the maximum value of the indicated value $v_S$ of the control $RE_S$ is, for example, "127". Besides, the minimum value of the indicated value $v_S$ of the control $RE_S$ is, for example, "0" (zero). The indicated value calculating part $PS_V$ supplies the calculated indicated value $v_S$ to the parameter value calculating part $PS_{PR}$ in step S14, and finishes the indicated value calculating process in step S15.

Next, the parameter value calculating part $PS_{PR}$ is described. The parameter value calculating part $PS_{PR}$ calculates the parameter values corresponding to the indicated values $v_S$ supplied from the indicated value calculating part $PS_V$ respectively. The parameter value calculating part $PS_{PR}$ obtains the parameter values $p_{S1}$, $p_{S2}$ with reference to the parameter setting table $TB_{PR}$, and obtains the parameter value $p(v_S)$ corresponding to the indicated value $v_S$ with reference to the template assigned to the control $RE_S$ (see FIG. 7A to FIG. 7E). Then, the parameter value calculating part $PS_{PR}$ applies the parameter values $p_{S1}$, $p_{S2}$, and $p(v_S)$ to the following mathematical expression (2). A parameter value $p_{out}(v_S)$ is thereby calculated.

Math. 2

$$p_{out}(v_S) \leftarrow \frac{p_{S2} - p_{S1}}{127} \times p(v_S) + p_{S1} \quad (2)$$

The parameter value calculating part $PS_{PR}$ supplies the calculated value $p_{out}(vs)$ and a parameter name assigned to the control $RE_S$ to the tone generator circuit 17. The tone generator circuit 17 generates an audio signal by using the supplied value $p_{out}(v_S)$. Besides, the parameter value calculating part $PS_{PR}$ turns on the light-emitting diode $LRE_S$ being one of the plurality of light-emitting diodes $LRE_S$ and disposed at a position corresponding to the parameter value $p_{out}(v_S)$. The electronic musical instrument 10 can display the present indicated value $v_S$ of the control $RE_S$ and the present value of the assigned parameter on the display 14, but the user can recognize a rough present value of the parameter also by the position of the turned-on light-emitting diode $LRE_S$.

In the first operation mode, the plurality of parameter values are changed only by operating one control (namely, the control $RE_M$), and therefore, it is possible for the user to complicatedly change the generation modes of the musical sounds in accordance with a situation. In addition, the user can arbitrary set the correspondence between the indicated value $v_M$ and the indicated values $v_{S=1, 2, \ldots, 8}$ (the control setting table $TB_{RE}$). Besides, the user can arbitrary set the correspondence between the indicated values $v_{S=1, 2, \ldots, 8}$ and the parameter values (the parameter setting table $TB_{PR}$). That is, it is possible for the user to arbitrary set the change of the generation modes of the musical sounds relative to the change of the indicated value $v_M$ of the control $RE_M$. It is thereby possible to change the generation modes of the musical sounds as the user intended. Further, when the user operates the control $RE_S$, the indicated value $v_S$ calculated based on the control setting table $TB_{RE}$ is revised in accordance with the operated amount. That is, according to the electronic musical instrument 10, it is possible for the user not only to simultaneously change the parameter values respectively assigned to the controls $RE_{S=1, 2, \ldots, 8}$ by operating the control $RE_M$, but also to change a value of only one of the parameters assigned to the control $RE_S$ by operating one control $RE_S$ to which the one parameter is assigned among the controls $RE_{S=1, 2, \ldots, 8}$.

(Second Operation Mode)

Next, a second operation mode of the electronic musical instrument 10 is described. In the first operation mode, when the user operates the control $RE_M$ by a hand, the generation modes of the musical sounds change in accordance with the operation. On the other hand, in the second operation mode, the electronic musical instrument 10 automatically changes the generation modes of the musical sounds by changing the indicated value $v_M$ in accordance with a pattern data PD representing a variation pattern of the indicated value $v_M$ of the control $RE_M$ even if the user does not operate the control $RE_M$. Specifically, the indicated value calculating part $PS_V$ reproduces the pattern data PD in synchronization with a tempo (or a tempo calculated based on the tempo) of a performance of other musical instruments or the like (for example, an electronic musical instrument, an acoustic musical instrument, a singing voice, and so on). Note that "the pattern data PD is reproduced" means that the indicated value calculating part $PS_V$ sequentially obtains data (in detail, later-described grid data $GD_1$ to $GD_{256}$) constituting the pattern data PD, and sequentially calculates the indicated value $v_M$ based on the obtained data.

As stated above, in the second operation mode, the parameter value is basically calculated in accordance with the pattern data PD. Note that the control $RE_M$ and the controls $RE_S$ function as controls for changing the generation modes of the musical sounds in real time as in the case of the first operation mode. That is, the user can change the parameter values calculated in accordance with the pattern data PD in real time by operating the control $RE_M$ or the controls $RE_S$ by a hand.

Figure 10:
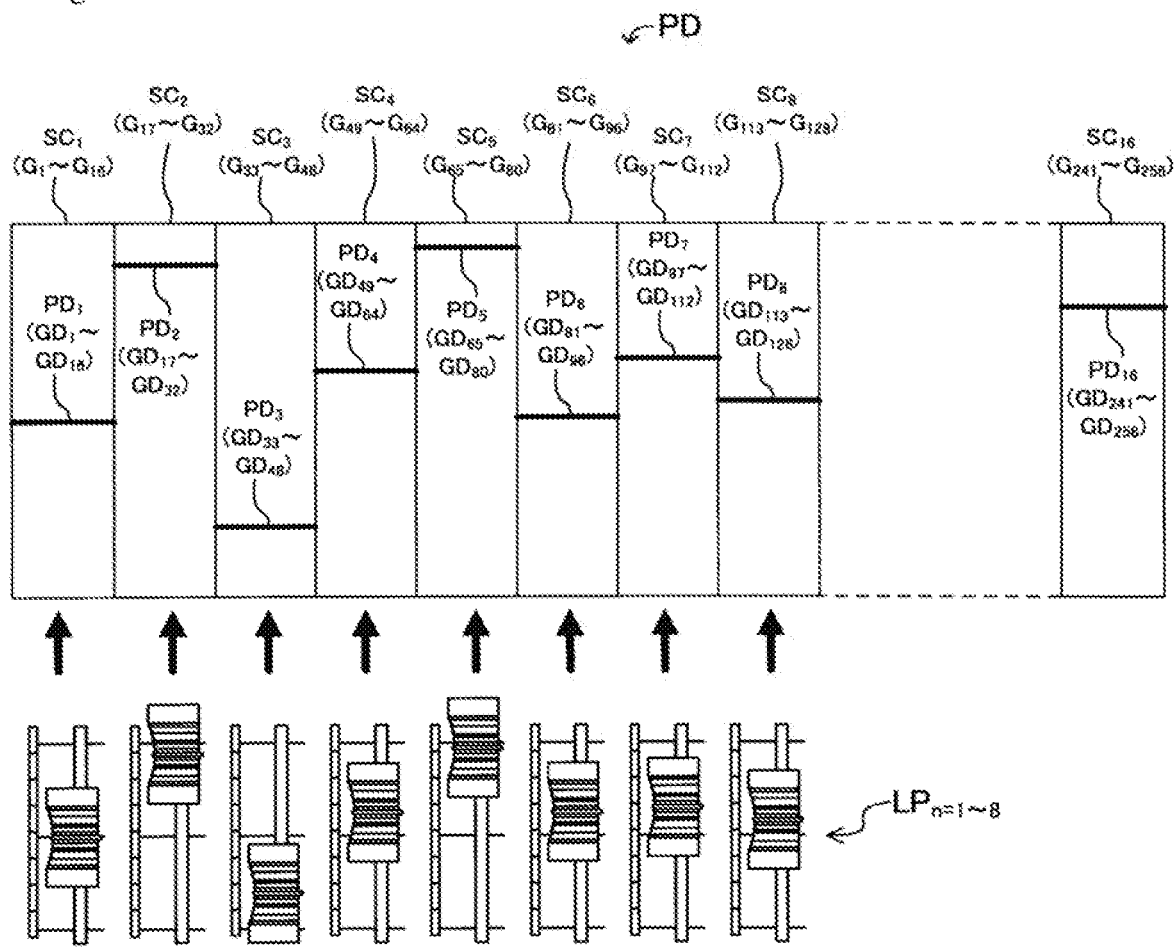
FIG. 10 is a conceptual diagram illustrating a creating procedure of a pattern data.

Besides, in the second operation mode, the controls $LP_{n=1, 2, \ldots, 8}$ function as the controls to input or edit the pattern data PD as illustrated in FIG. 10. The maximum value of an indicated value of the control $LP_n$ is "127". Besides, the minimum value of the indicated value of the control $LP_n$ is "0" (zero).

The variation pattern (the pattern data PD) is comprised of sixteen pieces of sections $SC_1$ to $SC_{16}$. A length of one section corresponds to a length of a sixteenth note. Further, respective sections $SC_1$ to $SC_{16}$ are each comprised of sixteen pieces of grids. Namely, the pattern data PD is comprised of grid data $GD_1$ to $GD_{256}$ respectively representing values to be outputted as the indicated value $v_M$ of the control $RE_M$ in 256 pieces of grids $G_1$ to $G_{256}$ (=the number of sections×the number of grids). In this embodiment, the sixteen pieces of grid data constituting one section have the same value to simplify the description. The grid data constituting each of the sections $SC_{x=1, 2, \ldots, 18}$ is denoted as a pattern data $PD_x$.

Figure 11:
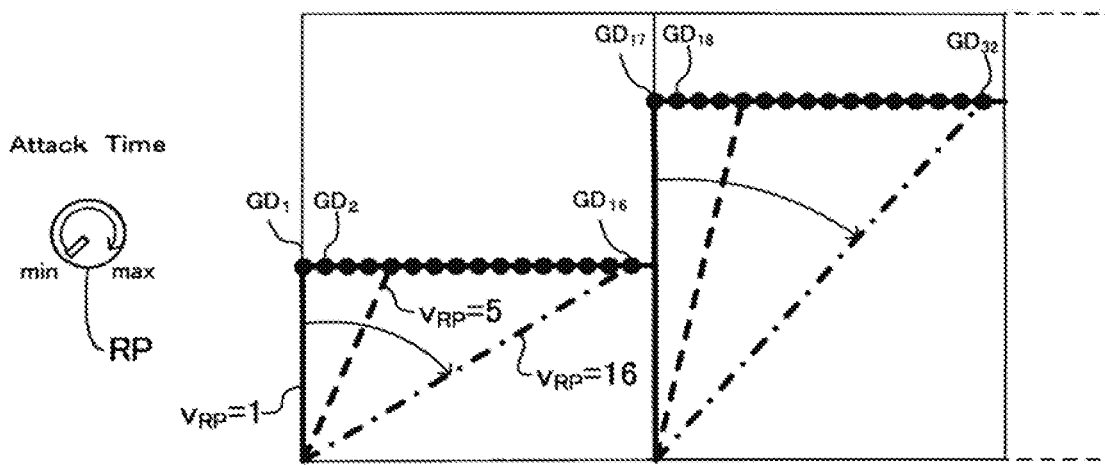
FIG. 11 is a conceptual diagram illustrating an operation to transform a variation pattern of the indicated value.

Besides, in the second operation mode, the control RP functions as the control for transforming the variation pattern of the indicated value $v_M$ in each section $SC_x$ in real time as illustrated in FIG. 11. An indicated value $v_{RP}$ of the control RP corresponds to, for example, an attack time of each section $SC_x$. The attack time corresponds to a time (the number of grids) at which the indicated value $v_M$ of the control $RE_M$ reaches the set value (namely, the pattern data $PD_x$) in each section $SC_x$ when the pattern data PD is reproduced. The minimum value of the indicated value $v_{RP}$ of the control RP is "1", and the maximum value thereof is "16". When the indicated value $v_{RP}$ of the control RP is small, the indicated value $v_M$ of the control $RE_M$ quickly reaches the set value from "0" (zero). On the other hand, when the indicated value $v_{RP}$ of the control RP is large, the indicated value $v_M$ of the control $RE_M$ slowly comes close to the set value from "0" (zero). For example, when the indicated value $v_{RP}$ of the control RP is "1", the indicated value $v_M$ of the control $RE_M$ changes in a staircase pattern as illustrated by a solid line in FIG. 11. Besides, for example, when the indicated value $v_{RP}$ of the control RP is "16", the indicated value $v_M$ of the control $RE_M$ changes in a sawtooth pattern as illustrated by a dot and dash line in FIG. 11. Note that the indicated value $v_M$ may be set to change from a value in the last grid of a previous section toward a set value of a next section at a rate in accordance with the attack time.

Besides, the control RS functions as a control (a tempo magnification determining control) for setting a tempo magnification representing a magnification of a reproduction tempo of the pattern data PD relative to the performance tempo of other musical instruments or the like. The user can select one tempo magnification from among, for example, "0.25", "0.5", "1", "2", and "4" in accordance with a switching state (the direction of the index $I_{RS}$) of the control RS. The control RS outputs a signal (a voltage value) representing the tempo magnification selected by the user as the indicated value $v_{RS}$.

Figure 12:
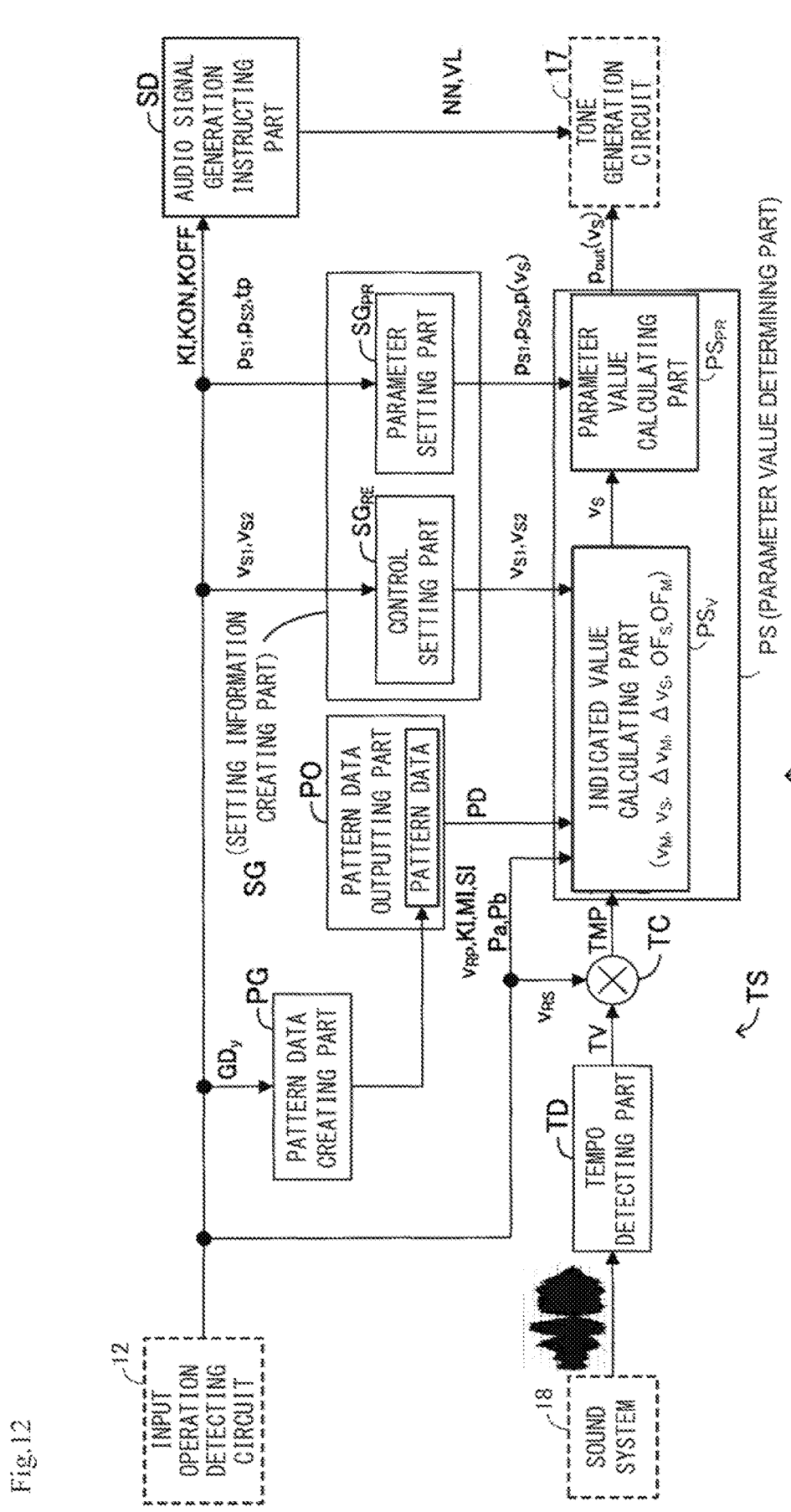
FIG. 12 is a functional block diagram of a second operation mode.

In the second operation mode, the CPU 13a functions as the audio signal generation instructing part SD, the setting information creating part SG, a pattern data creating part PG, a pattern data outputting part PO, a tempo determining part TS, the parameter value determining part PS, and so on as illustrated in FIG. 12 by executing various programs. The tempo determining part TS includes a tempo detecting part TD and a tempo calculating part TC.

Operations of the audio signal generation instructing part SD, the setting information creating part SG and the parameter value calculating part $PS_{PR}$ are the same as the operations in the first operation mode, and therefore, descriptions thereof are not given.

Next, the pattern data creating part PG is described. The pattern data creating part PG previously creates the pattern data PD in accordance with an instruction of the user. That is, the user operates the control $LP_n$ to input data to constitute the pattern data PD. When creating the pattern data PD, the pattern data creating part PG displays a graphic chart representing the variation pattern (that is, the pattern data PD) of the indicated value $v_M$ on the display 14. First, the pattern data creating part PG makes the controls $LP_1$ to $LP_8$ respectively correspond to pattern data $PD_1$ to $PD_8$ (refer to FIG. 10). When the user operates the controls $LP_1$ to $LP_8$, the graphic chart being displayed on the display 14 changes in accordance with the indicated values of the controls $LP_1$ to $LP_8$. The user operates the controls $LP_1$ to $LP_8$ such that shape of the graphic chart becomes a desired shape. When the user presses a not-illustrated determination switch, the pattern data creating part PG stores indicated values of the controls $LP_1$ to $LP_8$ in the RAM 13c as the pattern data $PD_1$ to $PD_8$. Next, the pattern data creating part PG makes the controls $LP_1$ to $LP_8$ respectively correspond to the pattern data $PD_9$ to $PD_{16}$. When the user inputs the pattern data of the latter-half section, the pattern data creating part PG stores indicated values of the controls $LP_1$ to $LP_8$ in the RAM 13c as the pattern data $PD_9$ to $PD_{16}$ as in the case of the first-half section. Note that, the created pattern data PD may be stored also in the ROM 13b, and the pattern data PD stored in the ROM 13b may be read when the second operation mode is restarted, and the read pattern data PD may be edited.

Next, the pattern data outputting part PO is described. The pattern data outputting part PO supplies grid data $GD_y$ constituting the pattern data PD to the indicated value calculating part $PS_V$ in accordance with a request from the indicated value calculating part $PS_V$.

Next, the tempo detecting part TD is described. The tempo detecting part TD sequentially obtains sample values constituting the audio waveform representing the performance of other musical instruments or the like from the A/D converter of the sound system 18 at a predetermined time interval. The tempo detecting part TD calculates the tempo of the performance of other musical instruments or the like by using the obtained sample value every time when a predetermined number (for example, 500 pieces) of sample values are obtained. For example, the tempo detecting part TD detects a plurality of musical beats based on change of the sample values, calculates a tempo value TV (a unit thereof is BPM=beats per minute) based on an interval of the detected musical beats, and supplies the tempo value TV to the tempo calculating part TC.

Next, the tempo calculating part TC is described. The tempo calculating part TC obtains the indicated value $v_{RS}$ of the control RS through the input operation detecting circuit 12 every time when the tempo value TV is obtained from the tempo detecting part TD. The tempo calculating part TC supplies a tempo value TMP obtained by multiplying the tempo value TV obtained from the tempo detecting part TD by the indicated value $v_{RS}$ obtained from the control RS, to the indicated value calculating part $PS_V$.

Next, the indicated value calculating part $PS_V$ is described. The indicated value calculating part $PS_V$ calculates the indicated values of the control $RE_M$ and the controls $RE_S$ based on the pattern data PD. First, an outline of operations of the indicated value calculating part $PS_V$ is described. The indicated value calculating part $PS_V$ starts reproduction of the pattern data PD when the interrupt signal KI is obtained. A reproduction tempo of the pattern data PD is synchronized with a tempo indicated by the tempo value TMP. Note that when the control $RE_M$ is manually operated in the second operation mode, the indicated value $v_M$ is revised in accordance with the manual operation amount $\Delta v_M$ of the operation.

The indicated value calculating part $PS_V$ calculates the indicated values $v_{S=1, 2, \ldots, 8}$ of the controls $RE_{S=1, 2, \ldots, 8}$ based on the indicated value $v_M$ and the control setting table $TB_{RE}$ every time when the indicated value $v_M$ is calculated or revised, and supplies the indicated values $v_{S=1, 2, \ldots, 8}$ to the parameter value calculating part $PS_{PR}$. When the control $RE_S$ is manually operated in the second operation mode, the indicated value $v_S$ is revised in accordance with the manual operation amount $\Delta v_S$ of the operation, and the revised indicated value $v_S$ is supplied to the parameter value calculating part $PS_{PR}$.

Figure 13B:
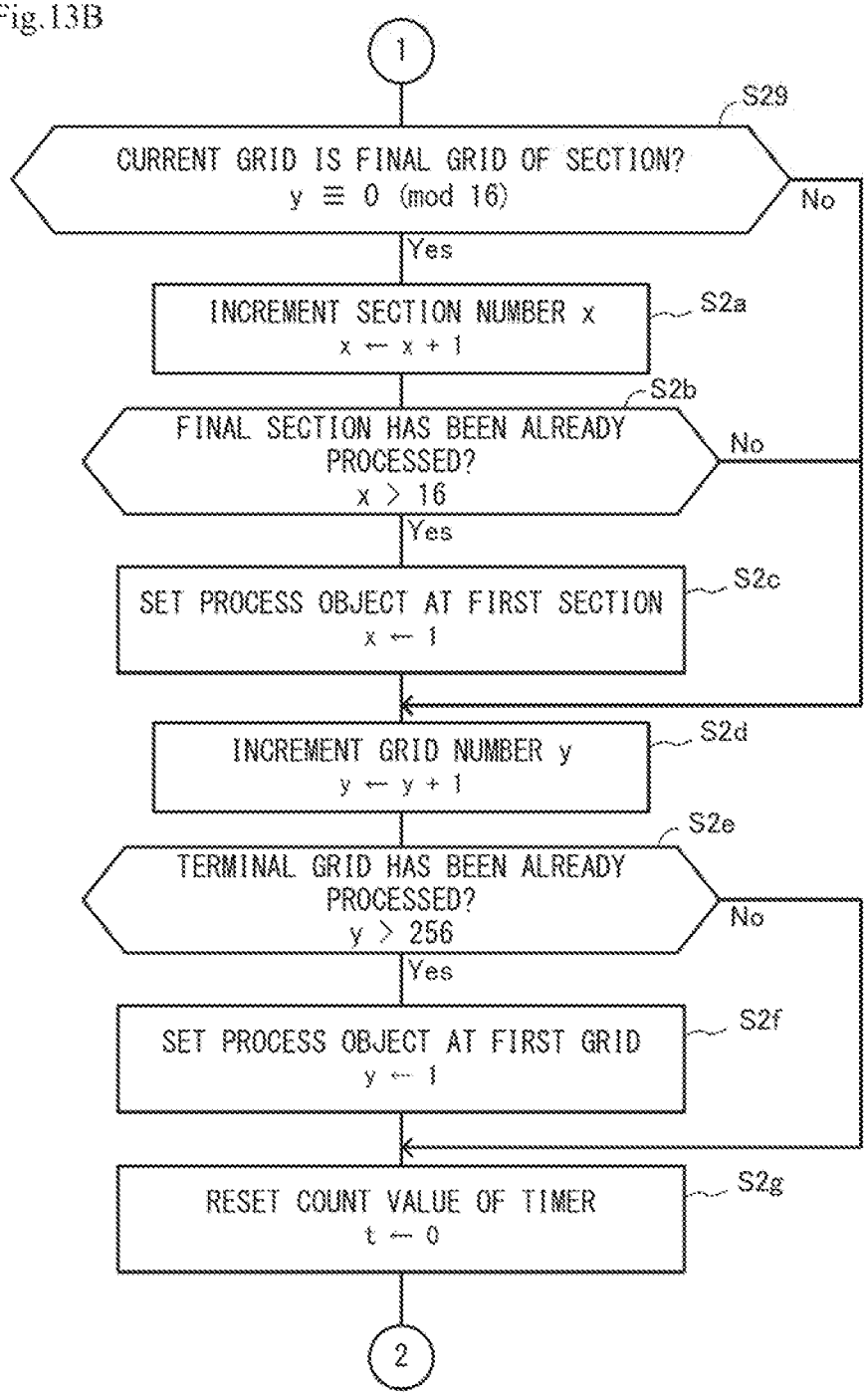
FIG. 13B is a flowchart illustrating a latter-half part of the indicated value calculating program.

Hereinafter, the indicated value calculating process in the second operation mode is concretely described. The indicated value calculating part $PS_V$ judges whether an interrupt factor is a key press or a key release when the interrupt signal KI is obtained. When the interrupt factor is the key press, the indicated value calculating part $PS_V$ reads and executes an indicated value calculating program illustrated in FIG. 13A and FIG. 13B from the ROM 13b. The indicated value calculating part $PS_V$ starts the indicated value calculating process in step S20. Next, the indicated value calculating part $PS_V$ executes an initialization process in step S21. For example, the indicated value calculating part $PS_V$ sets a section number x being a process object at "1". Besides, the indicated value calculating part $PS_V$ sets a grid number y being a process object at "1". Further, the indicated value calculating part $PS_V$ sets the count value t of the timer 13d at "0" (zero). Besides, the indicated value calculating part $PS_V$ sets the control offset $OF_S$ and a control offset $OF_M$ at "0" (zero), respectively. Here, the control offset $OF_M$ is described. Note that the control offset $OF_S$ is the same as the control offset $OF_S$ in the first operation mode, and therefore, the description thereof is not given.

The control offset $OF_M$ represents a modification amount of the indicated value $v_M$. This modification amount is recalculated in accordance with a manual operation amount every time when the control $RE_M$ is manually operated in the second operation mode.

Specifically, the control offset $OF_M$ is calculated by executing an interrupt routine as described below. When the knob of the control $RE_M$ is manually operated in the second operation mode, the input operation detecting circuit 12 supplies the interrupt signal MI indicating that the control $RE_M$ is operated to the indicated value calculating part $PS_V$. The indicated value calculating part $PS_V$ obtains the two pulse trains Pa, Pb outputted from the control $RE_M$ through the input operation detecting circuit 12 in response to the interrupt signal MI, and calculates the manual operation amount $\Delta v_M$ of the control $RE_M$ based on the number of pulses constituting the pulse train Pa (or the pulse train Pb) and the phase difference between the pulse trains Pa, Pb. When the rotation direction of the knob of the control $RE_M$ is clockwise, the manual operation amount $\Delta v_M$ is a positive value. On the other hand, when the rotation direction of the knob of the control $RE_M$ is counterclockwise, the manual operation amount $\Delta v_M$ is a negative value. The indicated value calculating part $PS_V$ adds the manual operation amount $\Delta v_M$ to the control offset $OF_M$.

Now, the description returns to the indicated value calculating process (FIG. 13A) again. The indicated value calculating part $PS_V$ makes the timer 13d start counting in step S22. Next, the indicated value calculating part $PS_V$ calculates the indicated value $v_M$ of the control $RE_M$ in step S23. Specifically, the indicated value calculating part $PS_V$ first obtains the grid data $GD_y$ corresponding to the grid number y being the present process object from among the grid data constituting the pattern data PD from the pattern data outputting part PO. Besides, the indicated value calculating part $PS_V$ obtains the indicated value $v_{RP}$ (that is, the attack time) of the control RP through the input operation detecting circuit 12. The indicated value calculating part $PS_V$ calculates the indicated value $v_M$ of the control $RE_M$ by applying the grid data $GD_y$ and the indicated value $v_{RP}$ to the following mathematical expression (3). Note that "min [A, B]" means that a smaller one of "A" and "B" is selected.

Math. 3

$$v_M \leftarrow \min\left[\frac{GD_y}{v_{RP}} \times (y - 16(x-1)), GD_y\right] \quad (3)$$

Next, the indicated value calculating part $PS_V$ revises the indicated value $v_M$ by adding the control offset $OF_M$ to the calculated indicated value $v_M$ in step S24. Note that the control offset $OF_M$ has been calculated in the above-stated interrupt routine.

Next, the indicated value calculating part $PS_V$ calculates the indicated value $v_S$ of the control $RE_S$ in step S25 as in the case of the first operation mode.

Next, the indicated value calculating part $PS_V$ revises the indicated value $v_S$ by adding the control offset $OF_S$ to the calculated indicated value $v_S$ in step S26. Note that the control offset $OF_S$ has been calculated as in the case of the first operation mode.

Next, the indicated value calculating part $PS_V$ supplies the indicated value $v_S$ to the parameter value calculating part in step S27. Next, the indicated value calculating part $PS_V$ stands by until a process time of a next grid in step S28. Specifically, the indicated value calculating part $PS_V$ reads the count value t from the timer 13d, and reads the tempo value TMP from the tempo calculating part TC. Then, the tempo value TMP is applied to the following mathematical expression (4) to calculate a time $\Delta t$ until the process time of the next grid.

Math. 4

$$t \geq dt = \frac{60}{TMP} \times \frac{1}{64} \quad (4)$$

Then, the indicated value calculating part $PS_V$ compares the count value t of the timer 13d and the calculated time $\Delta t$. When the count value t is smaller than the time $\Delta t$, the indicated value calculating part $PS_V$ judges as "No", and executes the step S28 again. On the other hand, when the count value t is the time $\Delta t$ or more, the indicated value calculating part $PS_V$ judges as "Yes", and proceeds the process to step S29.

Next, the indicated value calculating part $PS_V$ judges whether or not the present process object grid is the final grid of the present process object section in the step S29. That is, the indicated value calculating part $PS_V$ judges whether or not a remainder when the grid number y is divided by "16" is "0" (zero). When the remainder is different from "0" (zero), the indicated value calculating part $PS_V$ judges as "No", and proceeds the process to later-described step S23. On the other hand, when the remainder is "0" (zero), the indicated value calculating part $PS_V$ judges as "Yes", and increments the section number x in step S2a. That is, the process object section is set at a next section. Subsequently, the indicated value calculating part $PS_V$ judges whether or not the final section (the section $SC_{16}$) has been already processed in step S2b. When the section number x is "16" or less, the indicated value calculating part $PS_V$ judges as "No", and proceeds the process to step S2d. On the other hand, when the section number x is larger than "16", the indicated value calculating part $PS_V$ sets the process object at the first section in step S2c. That is, the indicated value calculating part $PS_V$ sets the section number x at "1".

Next, the indicated value calculating part $PS_V$ increments the grid number y in the step S2d. Next, the indicated value calculating part $PS_V$ judges whether or not a terminal grid (the grid $G_{256}$) has been already processed in step S2e. When the grid number y is "256" or less, the indicated value calculating part $PS_V$ judges as "No", and proceeds the process to step S2g. On the other hand, when the grid number y is larger than "256", the indicated value calculating part $PS_V$ sets the process object at a first grid in step S2f. That is, the indicated value calculating part $PS_V$ sets the grid number y at "1".

Next, the indicated value calculating part $PS_V$ resets the count value t of the timer 13d in the step S2g. That is, the indicated value calculating part $PS_V$ sets the count value t at "0" (zero). After that, the indicated value calculating part $PS_V$ repeatedly executes a series of processes made up of the steps S23 to S2g. Note that when the indicated value calculating part $PS_V$ newly obtains the interrupt signal KI, the indicated value calculating part $PS_V$ judges whether the interrupt factor is the key press or the key release. When the interrupt factor is the key press, the indicated value calculating part $PS_V$ proceeds the process to step S21 (a retrigger mode). Note that the series of processes made up of the steps S23 to S2g may be constantly repeated while ignoring the interrupt signal KI (a free run mode). It is conceivable that the electronic musical instrument 10 is configured such that the user can select either the retrigger mode or the free run mode. Besides, it is conceivable that the indicated value calculating part $PS_V$ starts the reproduction of the pattern data PD when the user instructs the reproduction of the pattern data PD by using the input control 11. Besides, it is conceivable that the indicated value calculating part $PS_V$ starts the reproduction of the pattern data PD while using reception of the audio signal from outside as a trigger.

In the second operation mode, it is possible to automatically change the values of the plurality of parameters even if the user does not operate the control. That is, the pattern data PD is reproduced in synchronization with the tempo (or a tempo calculated based on the tempo) of the performance of other musical instruments or the like. The generation modes of the musical sounds regarding the manual performance thereby change in synchronization with the performance of other musical instruments or the like. The generation modes of the musical sounds of the electronic musical instrument 10 are changed in accordance with the tempo (the musical beat) of the performance of other musical instruments or the like, thereby a sense of unity of the performance of the electronic musical instrument 10 with the performance of other musical instruments or the like increases, and fascinating representation becomes possible which is different from a case where the generation modes of the musical sounds are just changed randomly. In the second operation mode, there is no need for the user to operate the controls in accordance with the tempo of the performance of other musical instruments or the like, and therefore, it is possible to concentrate on the manual performance (for example, the keyboard performance). Besides, the user can arbitrary set the variation pattern of the indicated value $v_M$ of the control $RE_M$. That is, it is possible to change the generation modes of the musical sounds just as the user intended. Besides, the user can transform the set variation pattern by operating the control RP. Further, when the user operates the control $RE_M$ during the reproduction of the pattern data PD, the indicated value $v_M$ determined based on the pattern data PD is revised in accordance with the operation amount thereof. Besides, when the user operates the control $RE_S$ during the reproduction of the pattern data PD, the indicated value $v_S$ determined based on the pattern data PD and the control setting table $TB_{RE}$ is revised in accordance with the operation amount thereof. That is, it is possible to further change the generation modes of the musical sounds determined based on the pattern data PD by the user operating any one or a plurality of controls among the control RP, the control $RE_M$ and the controls $RE_S$. Besides, the user can change the reproduction tempo of the pattern data PD by operating the control RS during the reproduction of the pattern data PD.

Note that, in the second operation mode, the indicated value $v_M$ and the indicated values $v_S$ of the control $RE_M$ and the controls $RE_S$ respectively vary in accordance with the pattern data PD, and the display modes of the light-emitting element $LRE_M$ and the light-emitting diodes $LRE_S$ change in accordance with the variation. For example, it is conceivable that when the indicated value $v_M$ is small, the light-emitting element $LRE_M$ emits light in blue, and the emission color changes into yellow and red as the indicated value $v_M$ becomes larger. It is thereby possible to visually recognize the indicated value of each control (or the parameter value).

(Third Operation Mode)

Next, a third operation mode of the electronic musical instrument 10 is described. First, an outline of the third operation mode is described. In the first operation mode, when the user operates the control $RE_M$ by a hand, the generation modes of the musical sounds change in accordance with the operation. On the other hand, in the third operation mode, the generation modes of the musical sounds are automatically changed by changing the indicated value $v_M$ in accordance with an envelope of an audio waveform represented by an audio signal outputted from the tone generator circuit 17 even if the user does not operate the control $RE_M$. For example, when the manual performance is carried out using the keyboard device while reproducing a sequence data representing performances of a plurality of performance parts, the generation modes of the musical sounds of the manual performance part are automatically changed in accordance with the envelope of the audio waveform of a predetermined performance part (for example, a drum part) among the plurality of performance parts.

As stated above, in the third operation mode, the parameter value is basically calculated in accordance with the envelope of the audio waveform. Note that the control $RE_M$ and the controls $RE_S$ function as controls for changing the generation modes of the musical sounds in real time as in the case of the first operation mode. That is, the user can change the parameter values calculated in accordance with the envelope in real time by operating the control $RE_M$ or the controls $RE_S$ by a hand.

Figure 14:
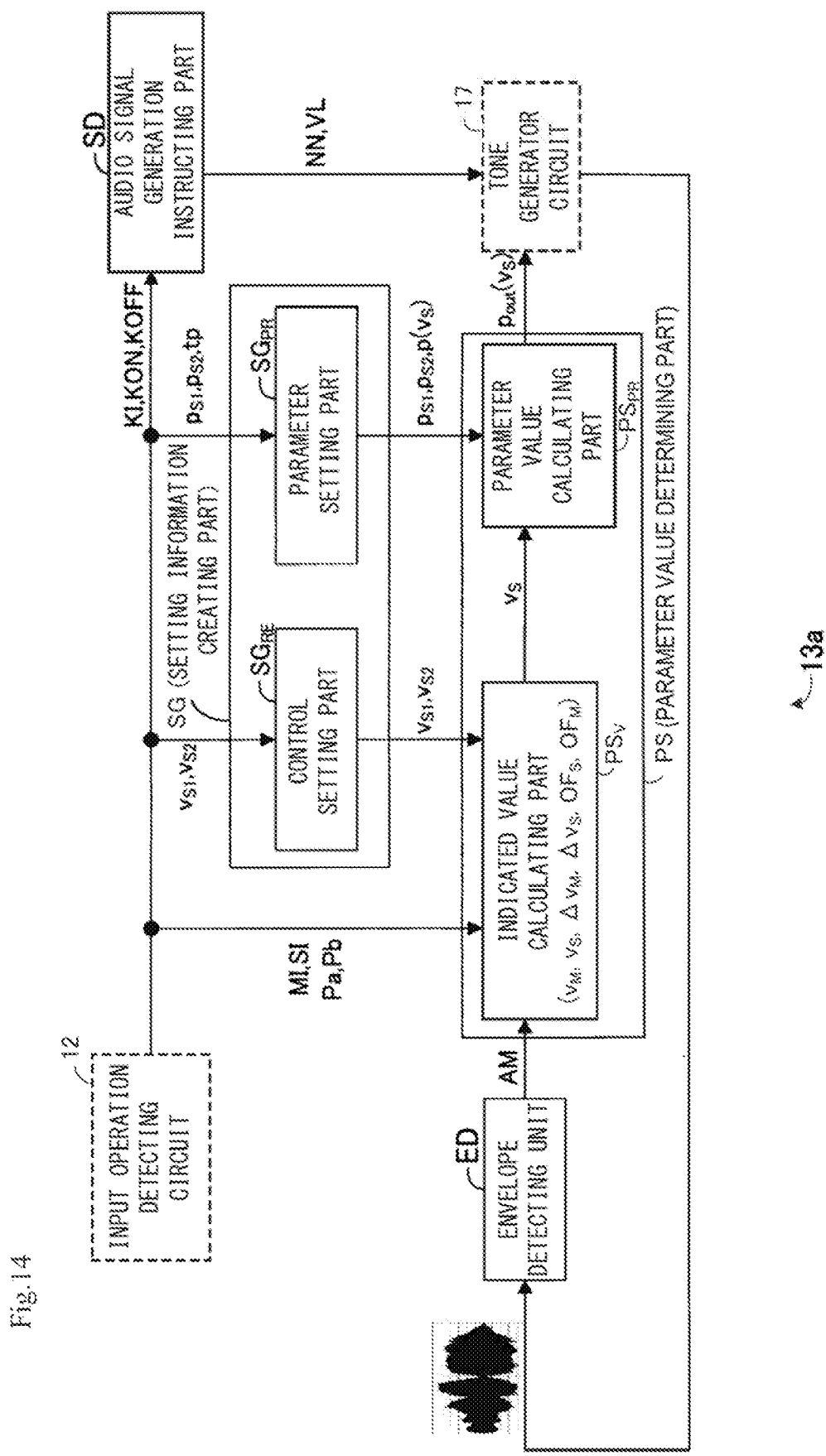
FIG. 14 is a functional block diagram of a third operation mode.

In the third operation mode, the CPU 13a functions as the setting information creating part SG, the audio signal generation instructing part SD, an envelope detecting part ED, the parameter value determining part PS, and so on as illustrated in FIG. 14 by executing various programs.

Operations of the setting information creating part SG and the parameter value calculating part $PS_{PR}$ are the same as the operations in the first operation mode, and therefore, the descriptions thereof are not given.

Next, the audio signal generation instructing part SD is described. The audio signal generation instructing part SD supplies the note number NN and the velocity VL corresponding to the pressed or released key to the tone generator circuit 17 as in the case of the first operation mode. Further, the audio signal generation instructing part SD reproduces a sequence data representing a performance of a music (or phrases). When the user selects one sequence data using the input controls 11, and instructs to reproduce the selected sequence data, the audio signal generation instructing part SD reads the selected sequence data from the ROM 13b, and makes the timer 13d start counting. The sequence data contains a plurality of sound generation information. The sound generation information contains timing information indicating a sound generation timing in addition to the note number NN and the velocity VL. The audio signal generation instructing part SD searches the sound generation information containing the timing information coinciding with the present count value of the timer 13d, and supplies the note number NN and the velocity VL constituting the sound generation information found in the search, to the tone generator circuit 17.

Next, the envelope detecting part ED is described. The envelope detecting part ED detects and outputs the envelope of the inputted audio waveform. For example, the envelope detecting part ED outputs one envelope value constituting the envelope of the audio waveform every time when one sample value is newly obtained from the tone generator circuit 17. The envelope detecting part ED adds a "complement of two" of an envelope value as an output in a previous sampling period and the newly obtained sample value. Then, the envelope detecting part ED multiplies the added result by a coefficient corresponding to the envelope value in the previous sampling period, adds the multiplied result and the envelope value as the output in the previous sampling period, and supplies the result to the indicated value calculating part $PS_V$ as an envelope value AM in the present sampling period (refer to JP H09(1997)-97071 A).

Figure 15:
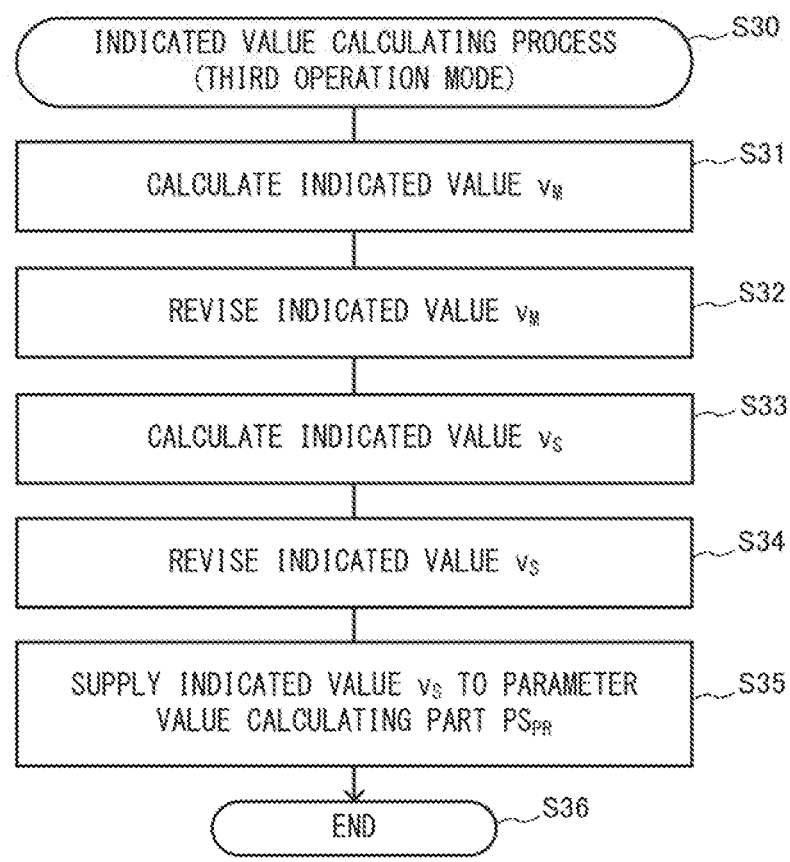
FIG. 15 is a flowchart of the indicated value calculating program.
Figure 16A:
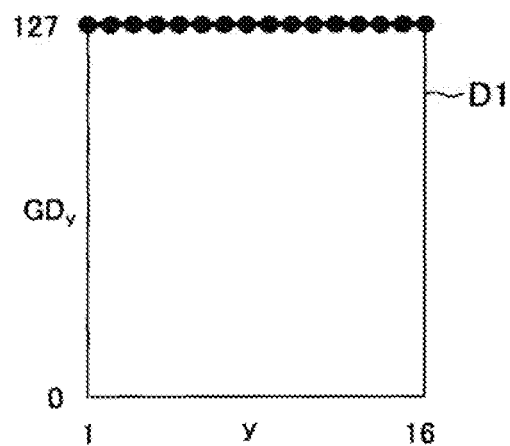
FIG. 16A to FIG. 16E respectively relate to modification examples of the invention, and illustrate graphic charts each representing a characteristic data used as a base of a section data.
Figure 16B:
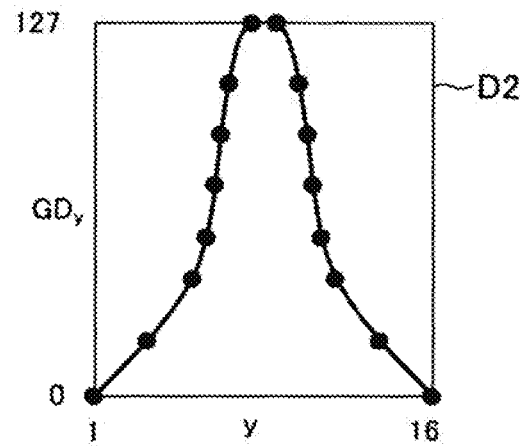
Figure 16C:
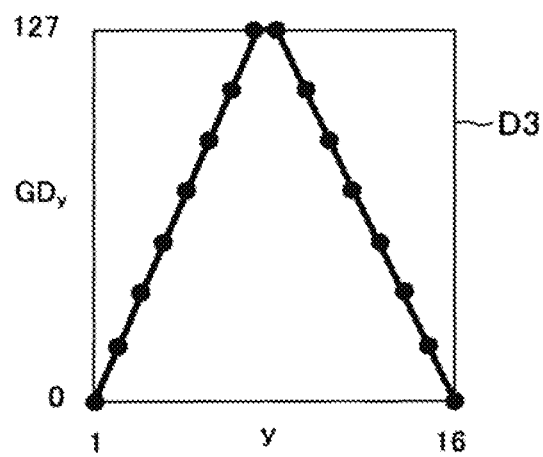
Figure 16D:
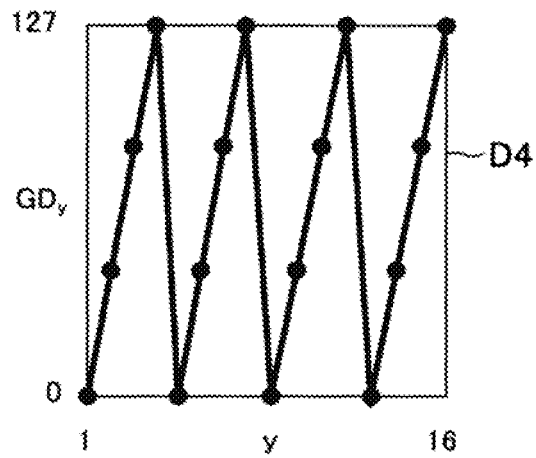
Figure 16E:
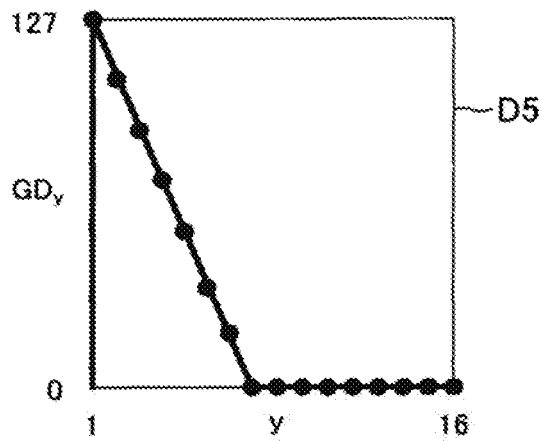

Next, the indicated value calculating part $PS_V$ is described. The indicated value calculating part $PS_V$ reads and executes an indicated value calculating program illustrated in FIG. 15 from the ROM 13b every time when the envelope value AM is obtained from the envelope detecting part ED. The indicated value calculating part $PS_V$ starts the indicated value calculating process in step S30. Next, the indicated value calculating part $PS_V$ calculates the indicated value $v_M$ using the obtained envelope value AM in step S31. Specifically, the indicated value calculating part $PS_V$ multiplies a predetermined coefficient (=the maximum value of the indicated value $v_M$/the maximum value of the sample value). The multiplied result is the indicated value $v_M$. Note that when the envelope value AM is normalized so as to fall within a range of the indicated value $v_M$ ("0" (zero) to "127"), the indicated value calculating part $PS_V$ does not execute the step S31, and proceeds the process to step S32. Next, the indicated value calculating part $PS_V$ revises the indicated value $v_M$ in the step S32 as in the case of the second operation mode. Next, the indicated value calculating part $PS_V$ calculates the indicated value $v_S$ in step S33 as in the case of the first and second operation modes. Next, the indicated value calculating part $PS_V$ revises the indicated value $v_S$ in step S34 as in the case of the first and second operation modes. Next, the indicated value calculating part $PS_V$ supplies the indicated value $v_S$ to the parameter value calculating part $PS_{PR}$ in step S35, and finishes the indicated value calculating process in step S36.

In the third operation mode, it is possible to automatically change the values of the plurality of parameters even if the user does not operate the control. That is, the generation modes of the musical sounds regarding the manual performance change in synchronization with the envelope of the musical sounds regarding the performance of one performance part selected from the plurality of performance parts constituting the automatic performance part. As stated above, the generation modes of the musical sounds of the manual performance part are changed in accordance with the envelope of the musical sounds of other performance parts, and thereby, the sense of unity of the performances of both performance parts increases, and fascinating representation becomes possible which is different from a case where the generation modes of the musical sounds are just changed randomly. In the third operation mode, there is no need for the user to operate the controls in accordance with the envelope of the musical sounds of other performance parts, and therefore, the user can concentrate on the manual performance (for example, the keyboard performance). Besides, when the user operates the control $RE_M$, the indicated value $v_M$ determined based on the envelope is revised in accordance with the operation amount thereof. Besides, when the user operates the control $RE_S$, the indicated value $v_S$ determined based on the envelope and the control setting table $TB_{RE}$ is revised in accordance with the operation amount thereof. That is, it is possible to further change the generation modes of the musical sounds determined based on the envelope by the user operating any one or a plurality of controls among the control $RE_M$ and the controls $RE_S$.

Note that in the third operation mode, the indicated value $v_M$ and the indicated values $v_S$ of the control $RE_M$ and the controls $RE_S$ respectively vary in accordance with the envelope of the audio waveform, and the display modes of the light-emitting element $LRE_M$ and the light-emitting diodes $LRE_S$ change in accordance with the variation. It is thereby possible to visually recognize the indicated value of each control (or the parameter value).

As stated above, according to the electronic musical instrument 10, it is possible to complicatedly change the generation modes of the musical sounds in accordance with the situation.

Further, the invention is not limited to the above-stated embodiments, and various modifications are possible without departing from objects of the invention.

In the embodiment, the generation modes of the audio signals generated at the tone generator circuit 17 are controlled in accordance with the parameter values determined at the parameter value determining part PS. However, the audio waveform signals stored in advance may be reproduced and the generation modes of the musical sounds represented by the audio waveform signals may be controlled in accordance with the parameter values instead of the above. Besides, the audio waveform signals may be obtained from outside in real time, and the generation modes of the musical sounds represented by the obtained audio waveform signal may be controlled in accordance with the parameter values.

Besides, in the embodiment, an example where the invention is applied to the electronic musical instrument is described, but the invention is applicable to any devices as long as it is a device which controls parameters defining a content. For example, the invention is applicable to a video control device which produces video in real time. In this case, it is conceivable that parameters defining a contrast, a color tone, lightness, and so on of the video are assigned to the controls $RE_S$, and they are simultaneously changed. Besides, the video and the musical sound may be simultaneously changed in accordance with the parameter values.

Besides, in the embodiment, the controls illustrated in FIG. 2 are constituted by the rotary encoder, the rotary potentiometer, the linear potentiometer, and so on. However, the controls may be constituted by other devices. For example, the controls $RE_S$ and the control $RE_M$ may be each constituted by the rotary potentiometer or the linear potentiometer. Besides, for example, it is conceivable that designs corresponding to any one or a plurality of controls among the above-stated controls is displayed on the display 14, and when a part where the designs are displayed on a touch panel is touch-operated, operations are carried out as in the case when the controls are operated.

Besides, in the embodiment, the control setting table $TB_{RE}$ is set using the touch panel. However, the control setting table $TB_{RE}$ may be set using the controls $RE_S$ instead. In this case, for example, there may be provided push type switches (for example, a shift switch, a minimum value setting switch, and a maximum value setting switch) which are used when the control setting table $TB_{RE}$ is set. It is conceivable that when the shift switch and the minimum value setting switch are simultaneously pushed, the present indicated values $v_S$ of the respective controls $RE_S$ are set as the indicated values $v_{S1}$, and when the shift switch and the maximum value setting switch are simultaneously pushed, the present indicated values $v_S$ of the respective controls $RE_S$ are set as the indicated values $v_{S2}$. That is, when the shift switch and the minimum value setting switch are simultaneously pushed under a state where the respective controls $RE_S$ are set to indicate the indicated values $v_{S1}$, the respective indicated values $v_{S1}$ are taken as data of the control setting table $TB_{RE}$. Besides, when the shift switch and the maximum value setting switch are simultaneously pushed under a state where the respective controls $RE_S$ are set to indicate the indicated values $v_{S2}$, the respective indicated values $v_{S2}$ are taken as data of the control setting table $TB_{RE}$. Note that it is conceivable that the shift switch is omitted, and the present indicated values $v_S$ of the respective controls $RE_S$ are set as the indicated values $v_{S1}$ when the minimum value setting switch is pushed, and the present indicated values $v_S$ of the respective controls $RE_S$ are set as the indicated values $v_{S2}$ when the maximum value setting switch is pushed.

Besides, select switches respectively corresponding to the controls $RE_S$ may be provided instead of the shift switch. In this case, it is conceivable that when the select switch and the minimum value setting switch are simultaneously pushed, the present value of the control $RE_S$ corresponding to the pushed select switch is set as the indicated value $v_{S1}$ of the control $RE_S$, and when the select switch and the maximum value setting switch are simultaneously pushed, the present value of the control $RE_S$ corresponding to the pushed select switch is set as the indicated value $v_{S2}$ of the control $RE_S$.

Besides, in the embodiment, when the control $RE_S$ is manually operated, the control offset $OF_S$ corresponding to the manual operation is added to the indicated value $v_S$. However, even when the control $RE_S$ is manually operated, the manual operation may be ignored. Besides, in the second operation mode and the third operation mode, when the control $RE_M$ is manually operated, the control offset $OF_M$ corresponding to the manual operation is added to the indicated value $v_M$. However, even when the control $RE_M$ is manually operated, the manual operation may be ignored.

Besides, in the embodiment, the generation modes of the musical sounds of the manual performance part are changed, but the generation modes of the musical sounds of the automatic performance part may be changed. For example, in the third operation mode, the generation modes of the musical sounds of the automatic performance part may be changed using the envelope of the musical sounds of the manual performance part.

Besides, in the embodiment, the present indicated values $v_S$ corresponding to the current indicated value $v_M$ are calculated by linear interpolation. However, other arithmetic expressions may be used. Besides, a table representing a relationship between the present indicated value $v_M$ and the present indicated values $v_S$ may be provided.

Besides, in the embodiment, the parameter values corresponding to the indicated values $v_S$ calculated by the indicated value calculation part $PS_V$ are determined with reference to the parameter setting table $TB_{PR}$. However, the calculated indicated values $v_S$ themselves may be used as the parameter values. In this case, the parameter setting table $TB_{PR}$ may have only the parameter names assigned to the respective controls $RE_S$ as constitution data. Accordingly, it is possible to simplify the parameter setting table $TB_{PR}$.

Besides, in the embodiment, the indicated values $v_S$ corresponding to the indicated value $v_M$ calculated by the indicated value calculating part $PS_V$ are determined with reference to the control setting table $TB_{RE}$, and the parameter values corresponding to the determined indicated values $v_S$ are determined with reference to the parameter setting table $TB_{PR}$. However, a parameter setting table representing a correspondence between the indicated value $v_M$ and values of the parameters assigned to the respective controls $RE_S$ may be created, and the parameter values corresponding to the indicated value $v_M$ may be determined with reference to the parameter setting table. It is thereby possible to omit the control setting table $TB_{RE}$.

Besides, in the second operation mode, a plurality of pattern data PD may be created, and the indicated value calculating part $PS_V$ may simultaneously reproduce the plurality of pattern data PD. In this case, the indicated value calculating part $PS_V$ obtains the grid data constituting each of the plurality of the pattern data PD in each grid. The indicated value calculating part $PS_V$ may supply the obtained grid data to the parameter value calculating part $PS_{PR}$ as the indicated value $v_S$ of the assigned control $RE_S$. It is thereby possible not only to omit the control setting table $TB_{RE}$ but also to set the variation pattern of the indicated value $v_S$ in detail by each control $RE_S$.

Besides, in the second operation mode, the sixteen pieces of grid data constituting the pattern data $PD_x$ have the same value to simplify the description (refer to FIG. 10 and FIG. 11). However, the sixteen pieces of grid data constituting the pattern data $PD_x$ may be different. That is, there may be created the pattern data $PD_x$ where the indicated value $v_M$ of the control $RE_M$ changes in accordance with a predetermined characteristic in each section. For example, it is conceivable that the user can select one of characteristic data D1 to D5 which are set in advance as illustrated in FIG. 16A to FIG. 16E. The characteristic data D1 to D5 each represent change characteristics of the indicated value $v_M$ of the control $RE_M$ in one section. That is, the characteristic data D1 to D5 are each comprised of the sixteen pieces of grid data. In this case, the controls $LP_{n=1, 2, \ldots, 8}$ each function as a control for determining a coefficient which is to be multiplied with each grid data constituting the selected characteristic data.

Besides, in the second operation mode, a length of the variation pattern of the indicated value $v_M$ corresponds to a length of two bars. However, the length of the variation pattern may be changed. For example, it is conceivable that the length of the variation pattern corresponds to a length of four bars by increasing the number of sections. Besides, for example, it is conceivable that the length of the variation pattern corresponds to a length of one bar by decreasing the number of sections.

Besides, in the second operation mode, the indicated value $v_{RP}$ of the control RP corresponds to the attack time of each section. However, the indicated value $v_{RP}$ of the control RP may correspond to other parameters representing a transformation degree of the variation pattern of the indicated value $v_M$ in each section. For example, the indicated value $v_{RP}$ of the control RP may correspond to a decay time of each section. That is, in this case, the indicated value $v_M$ is attenuated at a constant rate from a middle of the section such that the indicated value $v_M$ becomes "0" (zero) at the final grid of each section. The decay time corresponds to a length (the number of grids) of a range where the indicated value $v_M$ is being attenuated.

Besides, in the second operation mode, the tempo of the performance of other musical instruments or the like are detected based on the audio waveform of the musical sounds of other musical instruments or the like, but the indicated value calculating part $PS_V$ may obtain information representing the tempo from the other musical instruments or the like or information containing information representing the tempos (for example, a MIDI clock). The tempo detecting part TD may detect the tempo using the obtained information. Besides, for example, the tempo detecting part TD may obtain information representing a video image, and may detect and output a reproduction tempo of the video image using the obtained information. For example, the tempo detecting part TD may detect timings of scene switching, and detect the tempo using the timings.

Besides, in the third operation mode, the envelope detecting part ED detects the envelope of the audio waveform of the musical sounds of the automatic performance part outputted from the tone generator circuit 17, but may detect the envelope of the audio waveform of other musical instruments or the like.

Besides, in the embodiment, the control $RE_M$ and the controls $RE_S$ are the controls operated by a hand. However, a control operated by a foot (a foot controller) may be used instead. Besides, it is conceivable that any one or a plurality of controls among the control $RE_M$ and the controls $RE_S$ (for example, the control $RE_M$) are interlocked with the foot controller.

REFERENCE SIGNS LIST

10 . . . electronic musical instrument, 11 . . . input controls, 12 . . . input operation detecting circuit, 13 . . . computer part, 14 . . . display, 17 . . . tone generator circuit, 18 . . . sound system, AM . . . envelope value, ED . . . envelope detecting part, $OF_M$, $OF_S$ . . . control offset, PD . . . pattern data, PS . . . parameter value determining part, $PS_{PR}$ . . . parameter value calculating part, $PS_V$ . . . indicated value calculating part, PO . . . pattern data outputting part, $RE_M$, $RE_S$ . . . control, SD . . . audio signal generation indicating part, SG . . . setting information creating part, $SG_{PR}$ . . . parameter setting part, $SG_{RE}$ . . . control setting part, $TB_{PR}$ . . . parameter setting table, $TB_{RE}$ . . . control setting table, TS . . . tempo determining part, TC . . . tempo calculating part, TD . . . tempo detecting part, TMP . . . tempo value, TV . . . tempo value, $v_M$, $v_S$ . . . indicated value

What is claimed is:

1. A content control device comprising:
a plurality of controls respectively assigned to a plurality of parameters for controlling properties of a content containing sound, each of the plurality of controls outputting a first indicated value in accordance with an operation amount of the respective control; and
a processor configured to:
obtain a second indicated value;
acquire predetermined setting information for determining a range of each of the respective first indicated values of the plurality of parameters; and
set the respective first indicated values of the plurality of parameters in accordance with the second indicated value and the setting information to control the properties of the content.

2. The content control device according to claim 1, wherein the processor is further configured to set an increase and decrease amount of the value of each parameter to be predeterminedly set, relative to an increase and decrease amount of the second indicated value.

3. The content control device according to claim 1, wherein the processor is further configured to set a mode of change of the value of each parameter to be predeterminedly set, relative to a mode of change of the second indicated value.

4. The content control device according to claim 3, wherein the processor is further configured to:
store a plurality of characteristic data used to define the mode of the change of the value of each parameter relative to the mode of the change of the second indicated value; and
set the mode of the change of the value of each parameter relative to the mode of the change of the second indicated value using a characteristic data selected from the plurality of characteristic data.

5. The content control device according to claim 1, wherein:
the second indicated value is a time-varying value, and
the processor is further configured to:
store a pattern data representing a variation pattern of the second indicated value and comprised of the second indicated value at each time point; and
sequentially obtain the second indicated value in accordance with the pattern data.

6. The content control device according to claim 5, wherein the processor is further configured to:
sequentially obtain information regarding the sound or the video contained in the content;
detect a tempo based on the obtained information;
sequentially obtain each second indicated value constituting the pattern data at the detected tempo; and
determine the values of the plurality of parameters corresponding to the obtained second indicated value respectively in accordance with the obtained second indicated value and the setting information.

7. The content control device according to claim 6, further comprising:
a tempo change determining control configured to output an indicated value representing a change in the detected tempo,
wherein the processor is further configured to revise the detected tempo in accordance with the indicated value of the tempo change determining control.

8. The content control device according to claim 5, wherein the processor is further configured to transform the variation pattern by adjusting the second indicated value in the pattern data.

9. The content control device according to claim 1, wherein the processor is further configured to:
detect an envelope of the sound contained in the content; and
sequentially obtain the second indicated value in accordance with the detected envelope.

10. The content control device according to claim 5, further comprising:
a first control, which is operable by a user, configured to output an indicated value specified by the user,
wherein the processor is further configured to revise the obtained second indicated value in accordance with the indicated value of the first control.

11. The content control device according to claim 9, further comprising:
a first control, which is operable by a user, configured to output an indicated value specified by the user,
wherein the processor is further configured to revise the obtained second indicated value in accordance with the indicated value of the first control.

12. The content control device according to claim 1, wherein the processor is further configured to:
calculate a plurality of third indicated values corresponding to the obtained second indicated value in accordance with the setting information;
calculate a plurality of parameter values corresponding to the calculated plurality of third indicated values in accordance with the setting information; and
revise the first indicated values of the parameters in accordance with the plurality of parameter values corresponding to calculated third indicated values.

13. The content control device according to claim 1, further comprising a display whose display mode changes in accordance with the second indicated value.

14. The content control device according to claim 1, wherein:
the content comprises musical sounds of a plurality of performance parts, and
the processor is further configured to control the properties of musical sounds of selected at least one of the performance parts among the content in accordance with the set first indicated values of the plurality of parameters.

15. A non-transitory machine-readable storage medium containing a program executable by a processor of a content control device that includes a plurality of controls assigned to a plurality of parameters for controlling properties of a content containing sound, each of the plurality of controls outputting a first indicated value in accordance with an operation amount of the respective control, to execute a method comprising the steps of:
obtaining a second indicated value;
acquiring predetermined setting information for determining a range of each of the respective first indicated values of the plurality of parameters; and
setting the respective first indicated values of the plurality of parameters in accordance with the second indicated value and the setting information to control the properties of the content.

16. The non-transitory machine-readable storage medium according to claim 15, wherein:
the second indicated value is a time-varying value, and
the method further includes the steps of:
storing a pattern data representing a variation pattern of the second indicated value and comprised of the second indicated value at each time point; and
sequentially obtaining the second indicated value in accordance with the pattern data.

17. The non-transitory machine-readable storage medium according to claim 15, wherein the method further includes the steps of:
detecting an envelope of the sound contained in the content; and
sequentially obtaining the second indicated value in accordance with the detected envelope.

18. A method of controlling a content containing sound using a content control device that includes a plurality of controls to which a plurality of parameters for controlling properties of the content are respectively assigned, each of the plurality of controls outputting a first indicated value in accordance with an operation amount of the respective control, the method comprising the steps of:
obtaining a second indicated value;
acquiring predetermined setting information for determining a range of each of the respective first indicated values of the plurality of parameters; and
setting the respective first indicated values of the plurality of parameters in accordance with the second indicated value and the setting information to control the properties of the content.

19. The method according to claim 18, wherein:
the second indicated value is a time-varying value, and
the method further includes the steps of:
storing a pattern data representing a variation pattern of the second indicated value and comprised of the second indicated value at each time point; and
sequentially obtaining the second indicated value in accordance with the pattern data.

20. The method according to claim 18, further including the steps of:
detecting an envelope of the sound contained in the content; and
sequentially obtaining the second indicated value in accordance with the detected envelope.

* * * * *